(12) United States Patent
Yoshida et al.

(10) Patent No.: US 7,948,843 B2
(45) Date of Patent: May 24, 2011

(54) INFORMATION RECORDING MEDIUM, APPARATUS AND METHOD FOR RECORDING INFORMATION, AND COMPUTER PROGRAM

(75) Inventors: Masayoshi Yoshida, Saitama (JP); Toshiro Tanikawa, Saitama (JP); Tsuyoshi Hasebe, Saitama (JP); Shinji Suzuki, Saitama (JP); Tsuyoshi Namiki, Saitama (JP); Takeshi Koda, Saitama (JP); Keiji Katata, Saitama (JP)

(73) Assignee: Pioneer Corporation, Tokyo (JP)

( * ) Notice: Subject to any disclaimer, the term of this patent is extended or adjusted under 35 U.S.C. 154(b) by 1002 days.

(21) Appl. No.: 11/665,067

(22) PCT Filed: Oct. 12, 2005

(86) PCT No.: PCT/JP2005/018788
§ 371 (c)(1),
(2), (4) Date: Jun. 25, 2007

(87) PCT Pub. No.: WO2006/041090
PCT Pub. Date: Apr. 20, 2006

(65) Prior Publication Data
US 2009/0022029 A1   Jan. 22, 2009

(30) Foreign Application Priority Data
Oct. 12, 2004   (JP) .................................. 2004-297373

(51) Int. Cl.
*G11B 7/00* (2006.01)

(52) U.S. Cl. ................... 369/47.22; 369/53.24; 369/47.1
(58) Field of Classification Search ................. 369/47.1, 369/47.22, 53.24
See application file for complete search history.

(56) References Cited

U.S. PATENT DOCUMENTS

| 7,701,815 | B2 * | 4/2010 | Ueda et al. .................... 369/47.1 |
| 2004/0156294 | A1 | 8/2004 | Watanabe et al. |
| 2004/0257937 | A1 * | 12/2004 | Kato et al. ................... 369/47.22 |
| 2005/0162989 | A1 * | 7/2005 | Hwang et al. ............... 369/30.03 |
| 2006/0083141 | A1 * | 4/2006 | Teranishi et al. ........... 369/53.24 |

FOREIGN PATENT DOCUMENTS

| JP | 2000-293947 | 10/2000 |
| JP | 2002-352469 | 12/2002 |
| WO | 02/086873 | 10/2002 |

* cited by examiner

*Primary Examiner* — Wayne R Young
*Assistant Examiner* — Latanya Bibbins
(74) *Attorney, Agent, or Firm* — Young & Thompson

(57) ABSTRACT

Disclosed is an information recording medium (100) comprising a first recording layer (L0 layer) which is provided with a first recording track for recording record information, and a second recording layer (L1 layer) which is provided with a second recording track for recording record information. Each recording zone (zone #n) including one recording area in the first recording layer and another recording area in the second recording layer which is opposite to the recording area in the first recording layer has a management information recording area (RMA) for recording management information (RMD) for recording the record information.

15 Claims, 22 Drawing Sheets

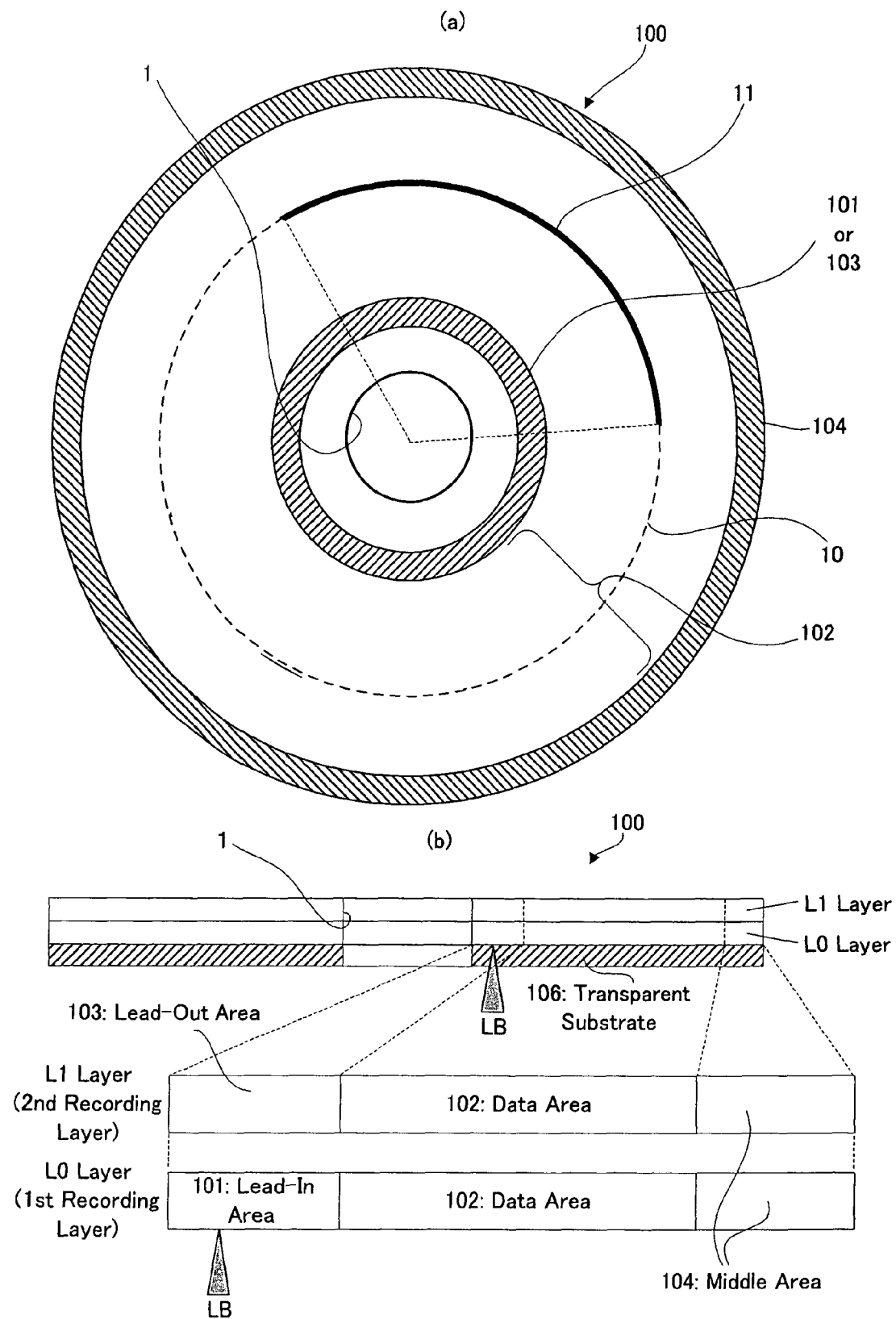

[FIG. 2]
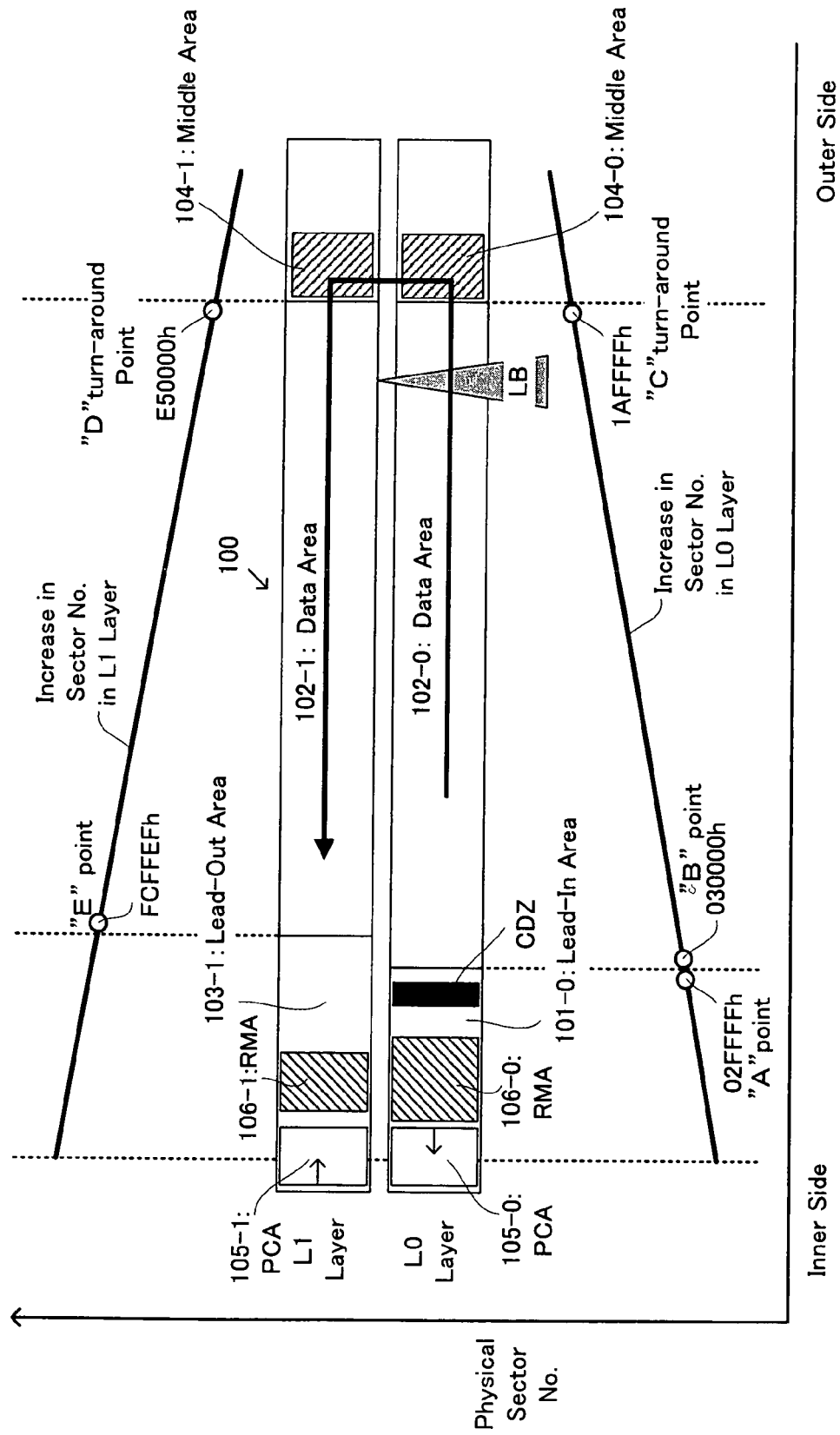

[FIG. 3]
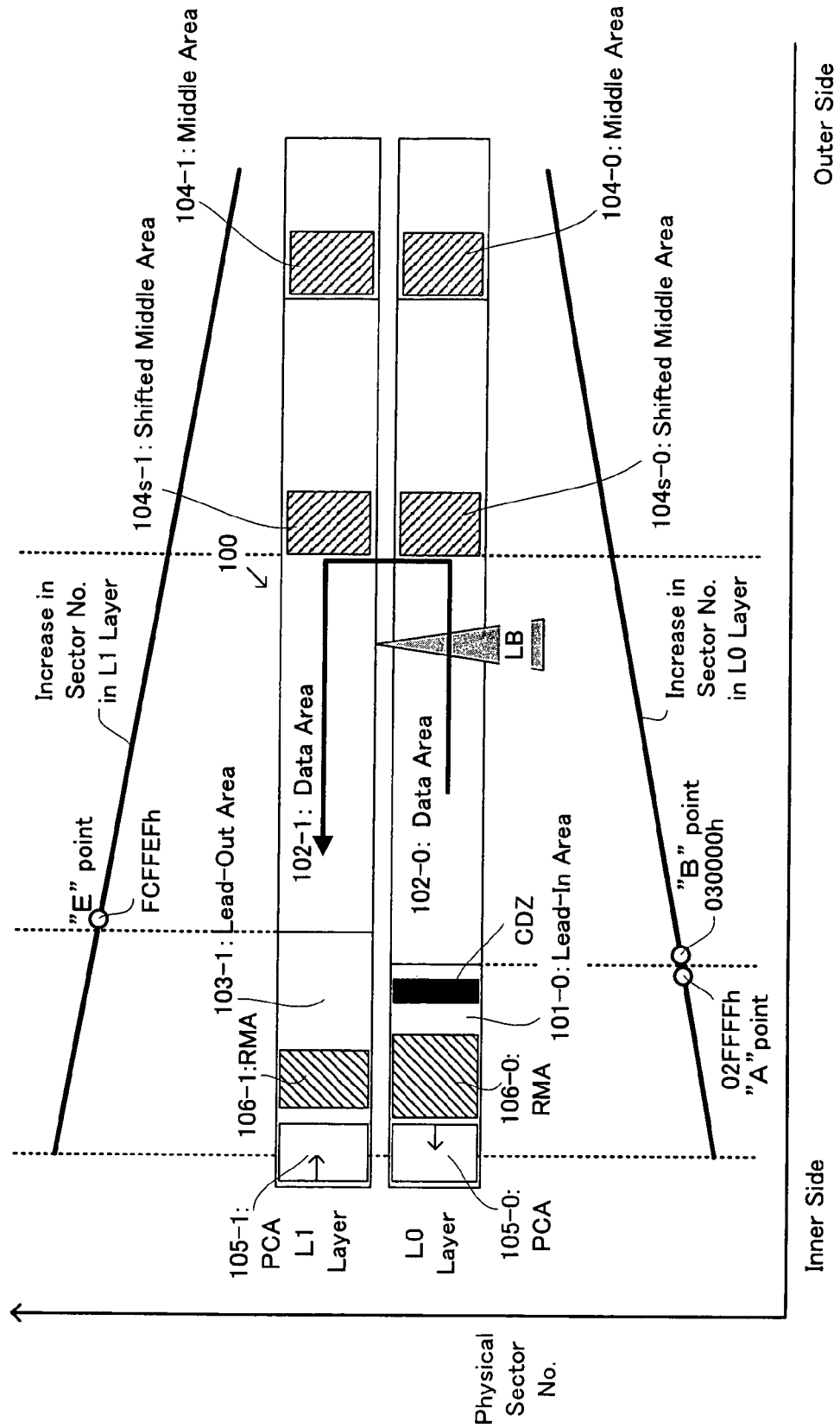

[FIG. 4]
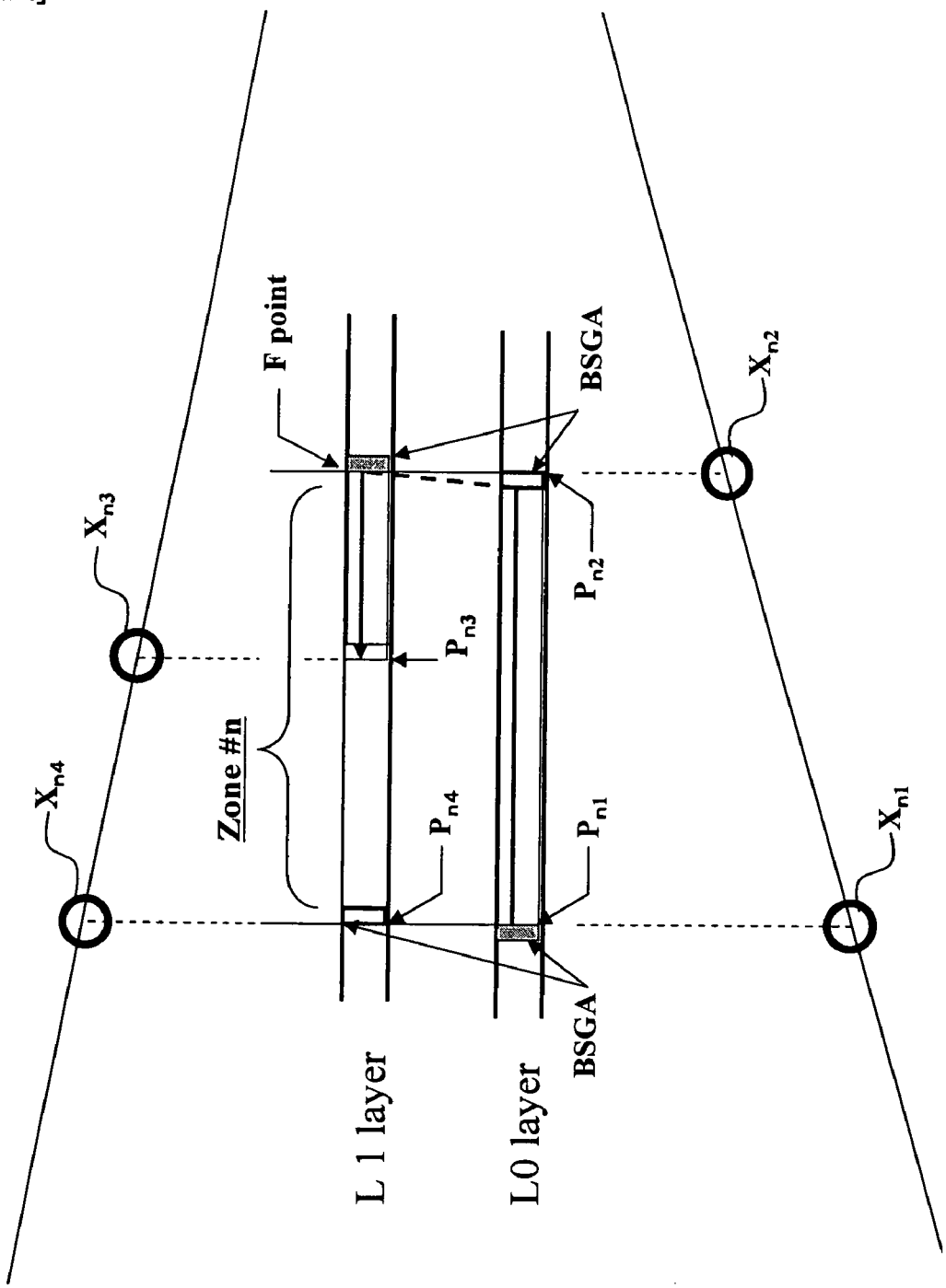

[FIG. 5]

Zone Info.(10) included in RMD

| Content | Byte No. | Value of Various Info. |
|---|---|---|
| Zone No. in Not-Recognized State | 0~1 | Zone No. 11a |
| Zone No. in 1st Reservation Available State | 2~3 | Zone No. 11b |
| Zone No. in 2nd Reservation Available State | 4~5 | Zone No. 11c |
| Sector No. of $P_{11}$ | 16~19 | $X_{11}$ |
| Sector No. of $P_{12}$ | 20~23 | $X_{12}$ |
| Sector No. of $P_{13}$ | 24~27 | $X_{13}$ |
| Sector No. of $P_{14}$ | 28~31 | $X_{14}$ |
| ... | ... | ... |
| ... | ... | ... |
| ... | ... | ... |
| Sector No. of $P_{n1}$ | 16n~16n+3 | $X_{n1}$ |
| Sector No. of $P_{n2}$ | 16n+4~16n+7 | $X_{n2}$ |
| Sector No. of $P_{n3}$ | 16n+8~16n+11 | $X_{n3}$ |
| Sector No. of $P_{n4}$ | 16n+12~16n+15 | $X_{n4}$ |
| ... | ... | ... |
| ... | ... | ... |
| ... | ... | ... |
| ... | ... | ... |
| ... | ... | ... |
| ... | ... | ... |

11: Point Info. (columns: Zone No. 11a, 11b, 11c)
12: Zone Specification Info.

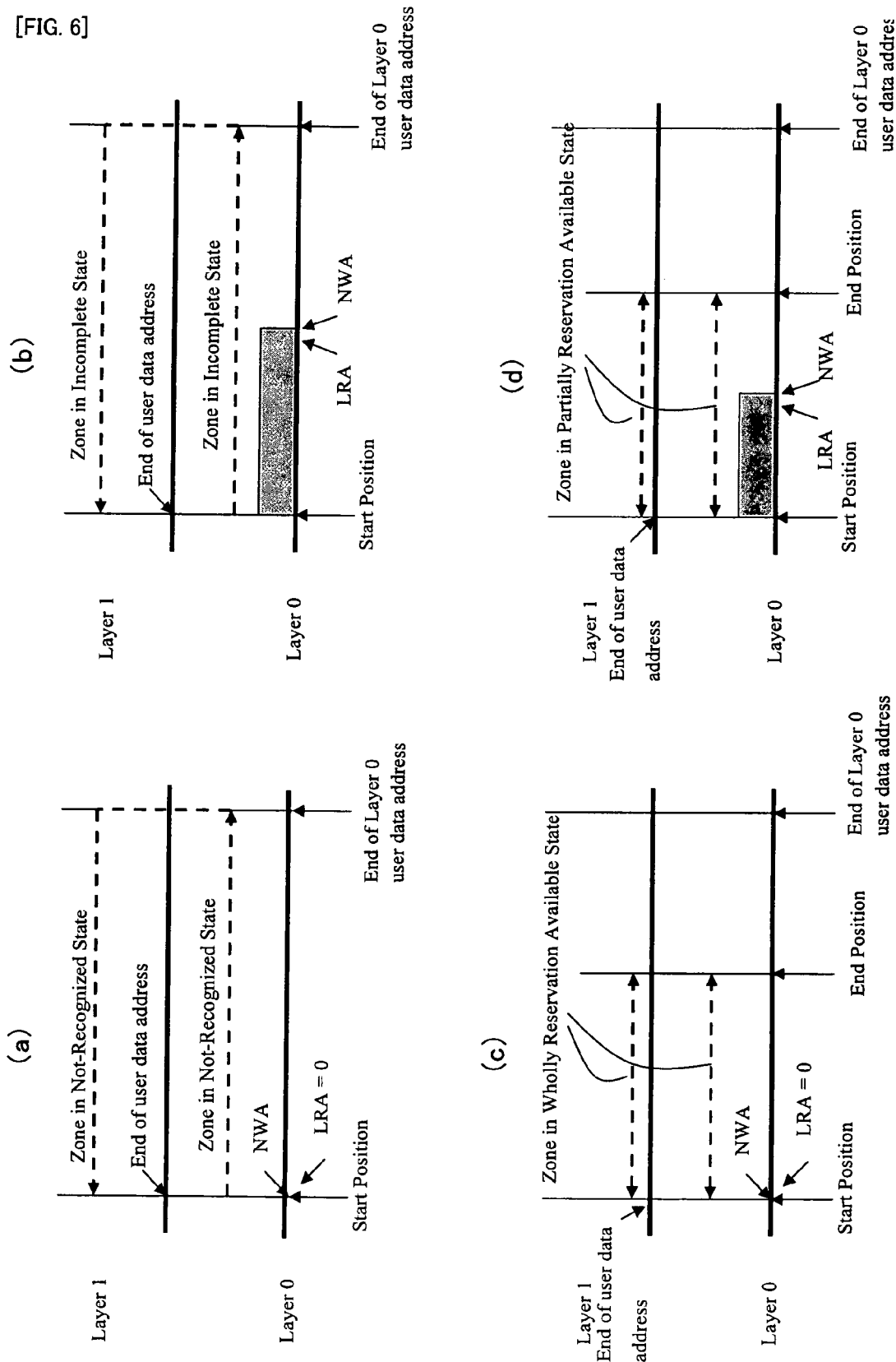

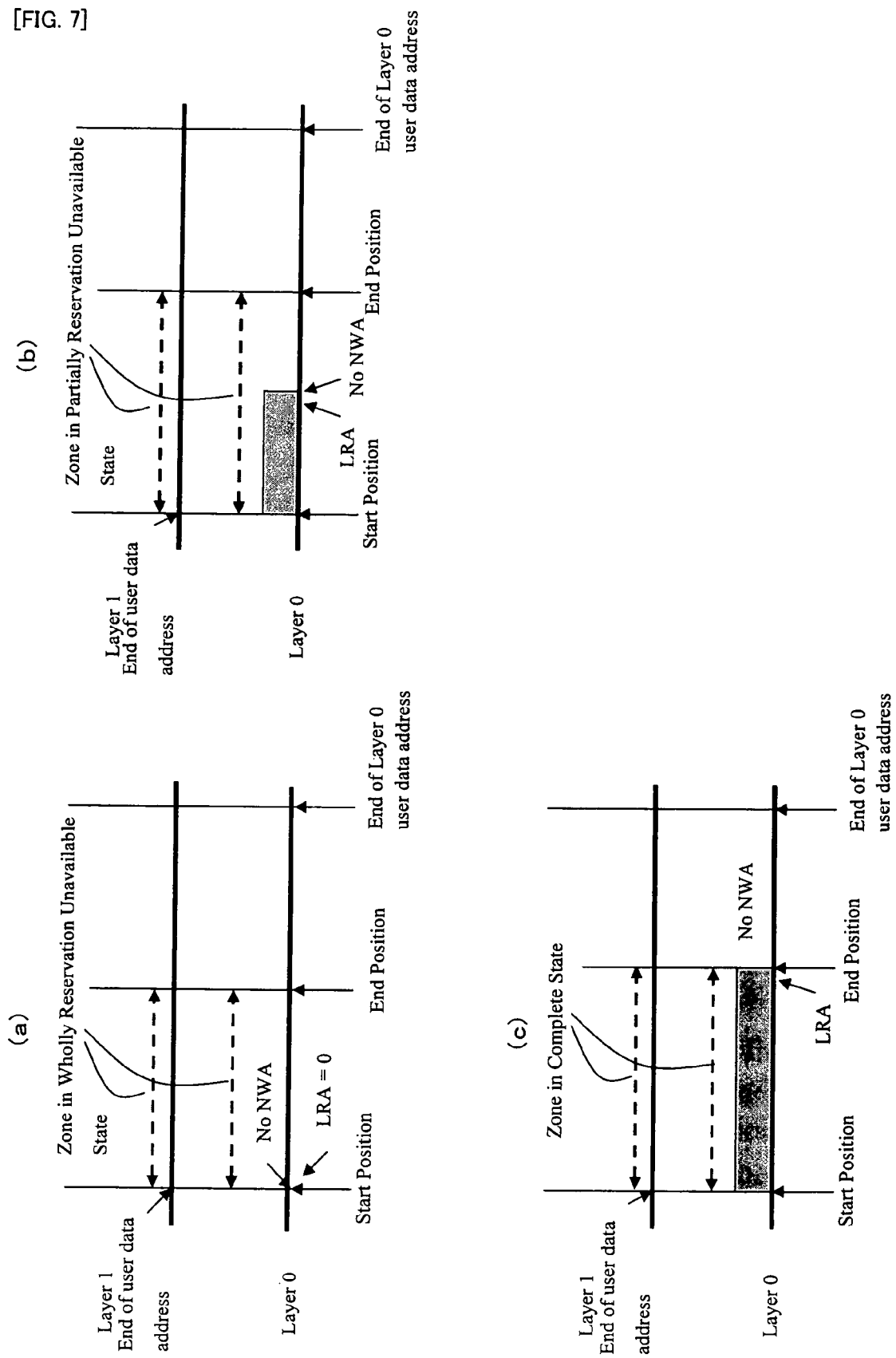
[FIG. 7]

[FIG. 8]
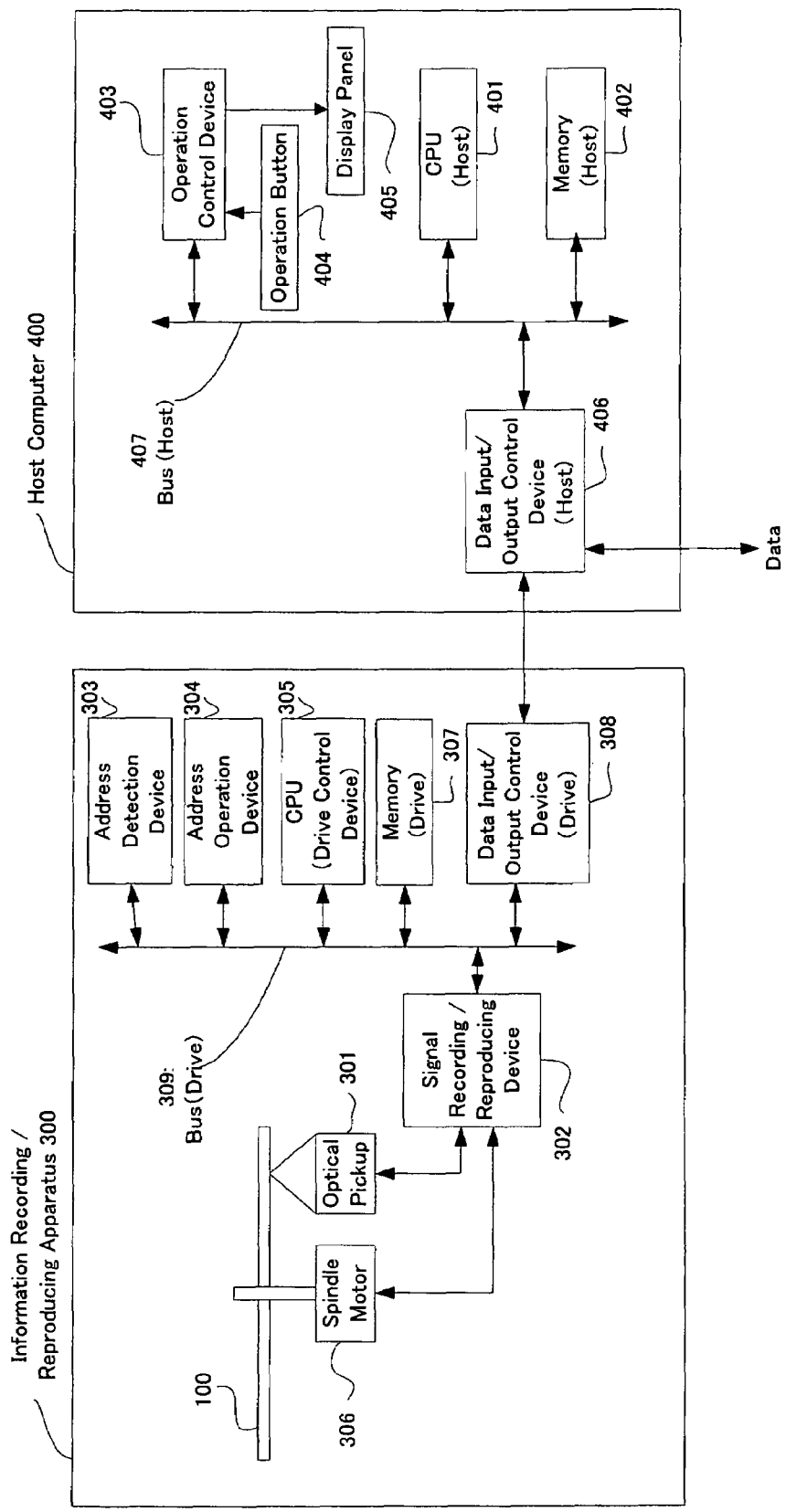

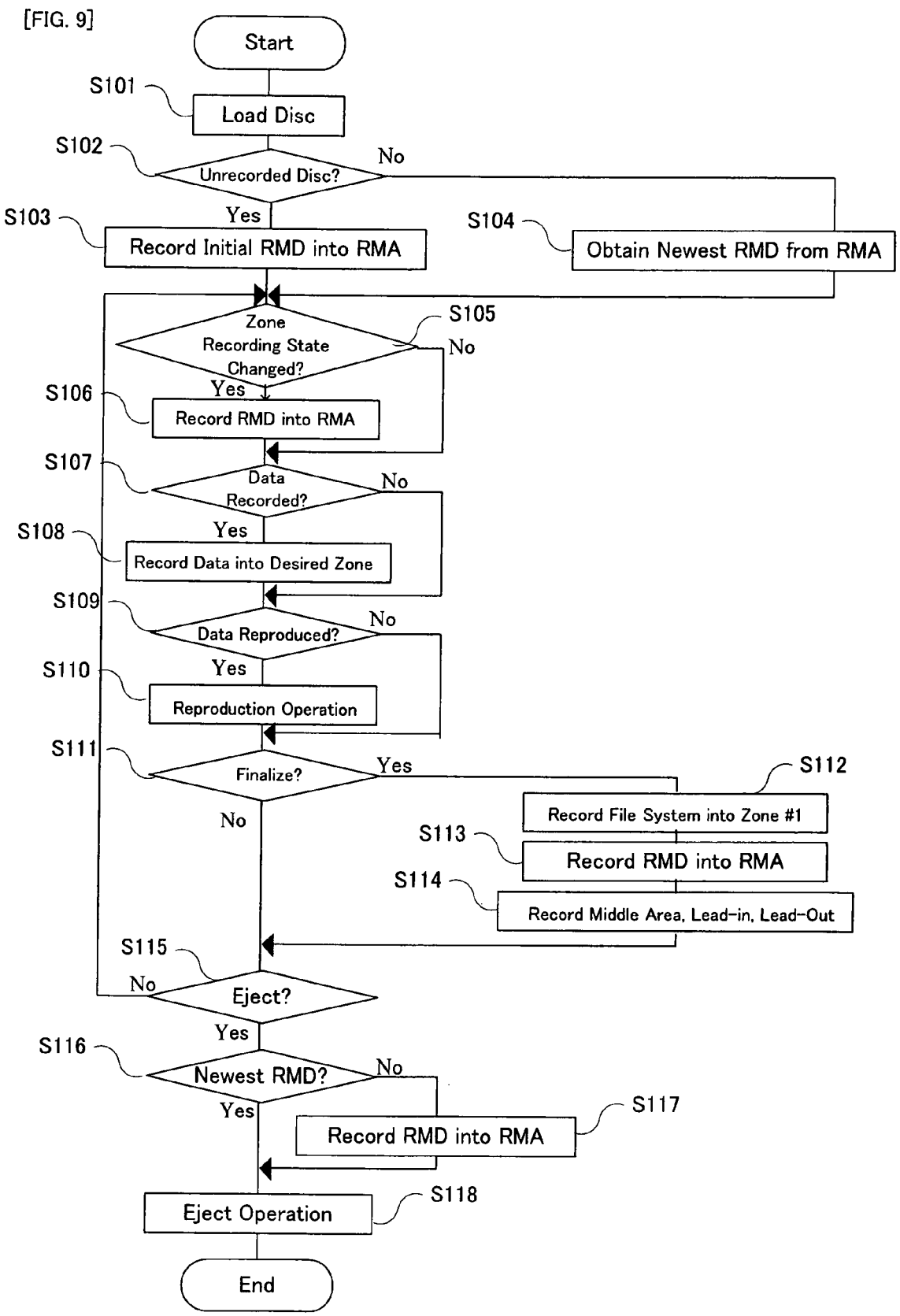

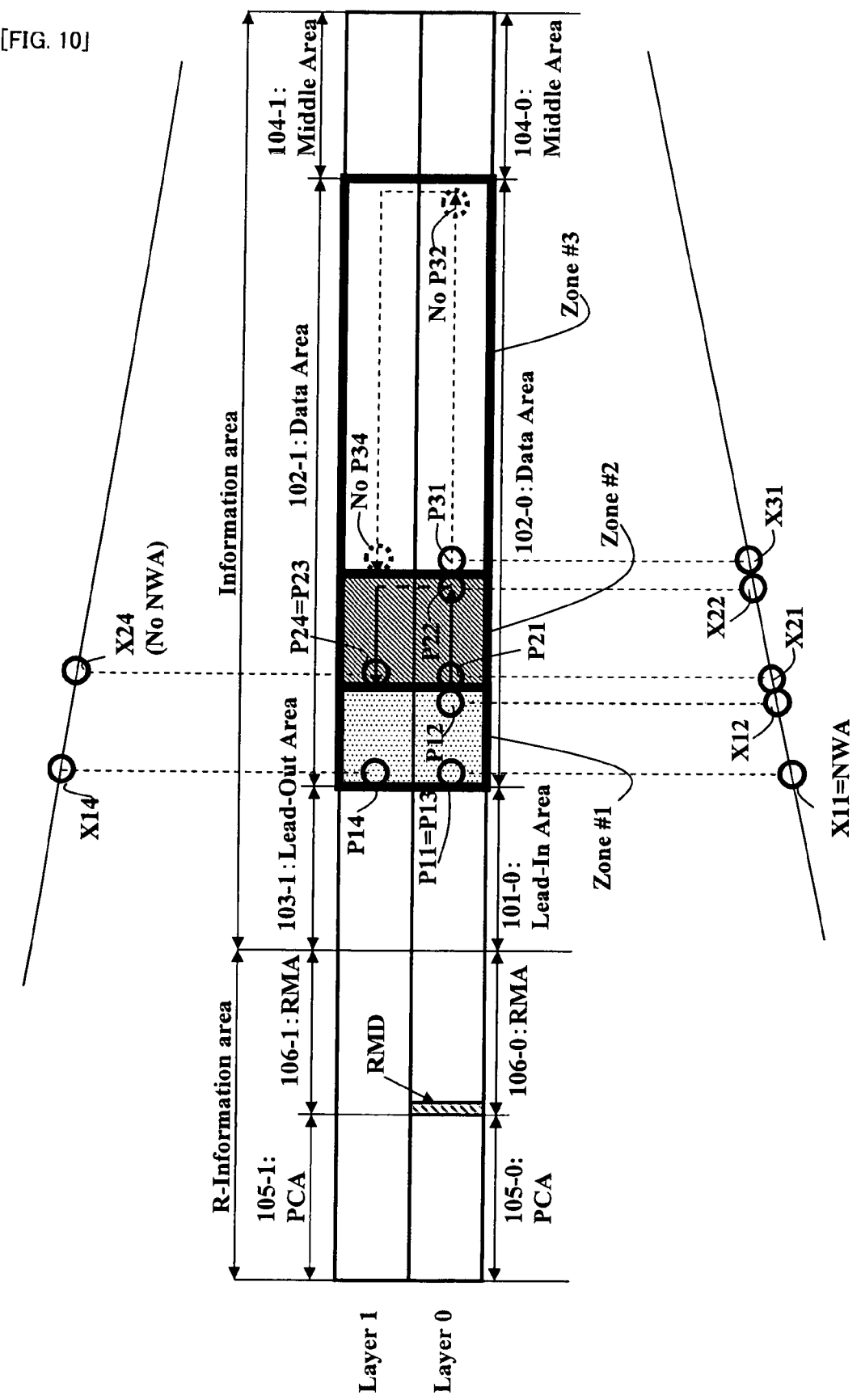
[FIG. 10]

[FIG. 11]

Zone Info.(10) included in RMD

| Content | Byte No. | Value of Various Info. |
|---|---|---|
| Zone No. in Not-Recognized State | 0~1 | #3 |
| Zone No. in 1st Reservation Available State | 2~3 | #1 |
| Zone No. in 2nd Reservation Available State | 4~5 | 0 |
| Sector No. of $P_{11}$ | 16~19 | $X_{11}$ |
| Sector No. of $P_{12}$ | 20~23 | $X_{12}$ |
| Sector No. of $P_{13}$ | 24~27 | $X_{11}$ (1st NWA) |
| Sector No. of $P_{14}$ | 28~31 | $X_{14}$ |
| Sector No. of $P_{21}$ | 32~35 | $X_{21}$ |
| Sector No. of $P_{22}$ | 36~39 | $X_{22}$ |
| Sector No. of $P_{23}$ | 40~43 | $X_{24}$ (No NWA) |
| Sector No. of $P_{24}$ | 44~47 | $X_{24}$ |
| Sector No. of $P_{31}$ | 48~51 | $X_{31}$ |
| Sector No. of $P_{32}$ | 52~55 | 0(No Definition) |
| Sector No. of $P_{33}$ | 56~59 | $X_{31}$ (2nd NWA) |
| Sector No. of $P_{34}$ | 60~63 | 0(No Definition) |
| Sector No. of $P_{41}$ | 64~67 | 0 |
| Sector No. of $P_{42}$ | 68~71 | 0 |
| Sector No. of $P_{43}$ | 72~75 | 0 |
| Sector No. of $P_{44}$ | 76~79 | 0 |
| Sector No. of $P_{51}$ | 80~83 | 0 |
| ... | ... | ... |
| Sector No. of $P_{127-4}$ | 2044~2047 | 0 |

11 : Pointer Info.

12 : Zone Info.

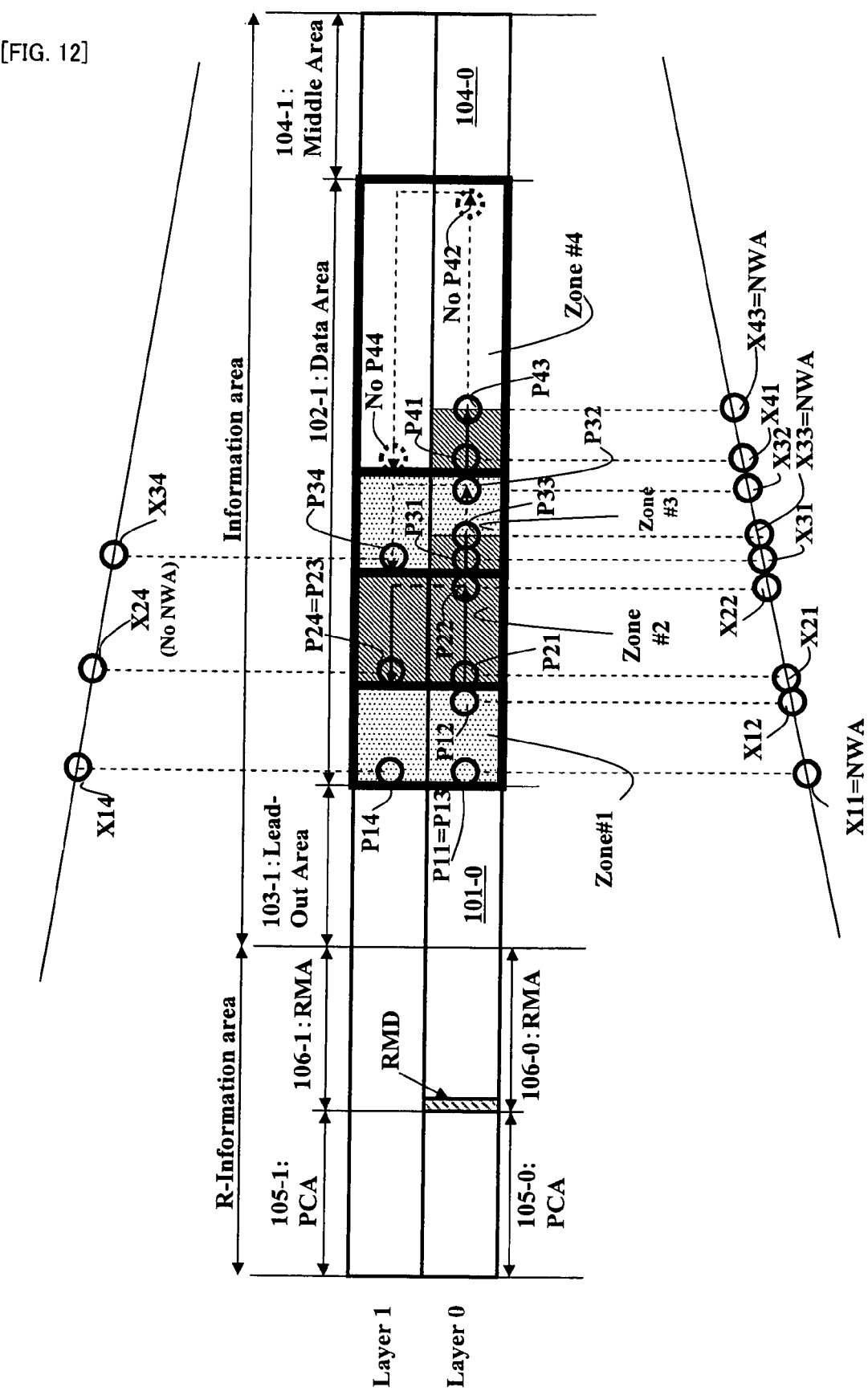
[FIG. 12]

[FIG. 13]

11: Pointer Info.

12: Zone Specification Info.

Zone Info.(10) included in RMD

| Content | Byte No. | Value of Various Info. |
|---|---|---|
| Zone No. in Not-Recognized State | 0~1 | #4 |
| Zone No. in 1st Reservation Available State | 2~3 | #1 |
| Zone No. in 2nd Reservation Available State | 4~5 | #3 |
| Sector No. of $P_{11}$ | 16~19 | $X_{11}$ |
| Sector No. of $P_{12}$ | 20~23 | $X_{12}$ |
| Sector No. of $P_{13}$ | 24~27 | $X_{11}$ (1st NWA) |
| Sector No. of $P_{14}$ | 28~31 | $X_{14}$ |
| Sector No. of $P_{21}$ | 32~35 | $X_{21}$ |
| Sector No. of $P_{22}$ | 36~39 | $X_{22}$ |
| Sector No. of $P_{23}$ | 40~43 | $X_{24}$ (No NWA) |
| Sector No. of $P_{24}$ | 44~47 | $X_{24}$ |
| Sector No. of $P_{31}$ | 48~51 | $X_{31}$ |
| Sector No. of $P_{32}$ | 52~55 | $X_{32}$ |
| Sector No. of $P_{33}$ | 56~59 | $X_{33}$ (2nd NWA) |
| Sector No. of $P_{34}$ | 60~63 | $X_{34}$ |
| Sector No. of $P_{41}$ | 64~67 | $X_{41}$ |
| Sector No. of $P_{42}$ | 68~71 | 0(No Definition) |
| Sector No. of $P_{43}$ | 72~75 | $X_{43}$ (3rd NWA) |
| Sector No. of $P_{44}$ | 76~79 | 0(No Definition) |
| Sector No. of $P_{51}$ | 80~83 | 0 |
| ... | ... | ... |
| Sector No. of $P_{127-4}$ | 2044~2047 | 0 |

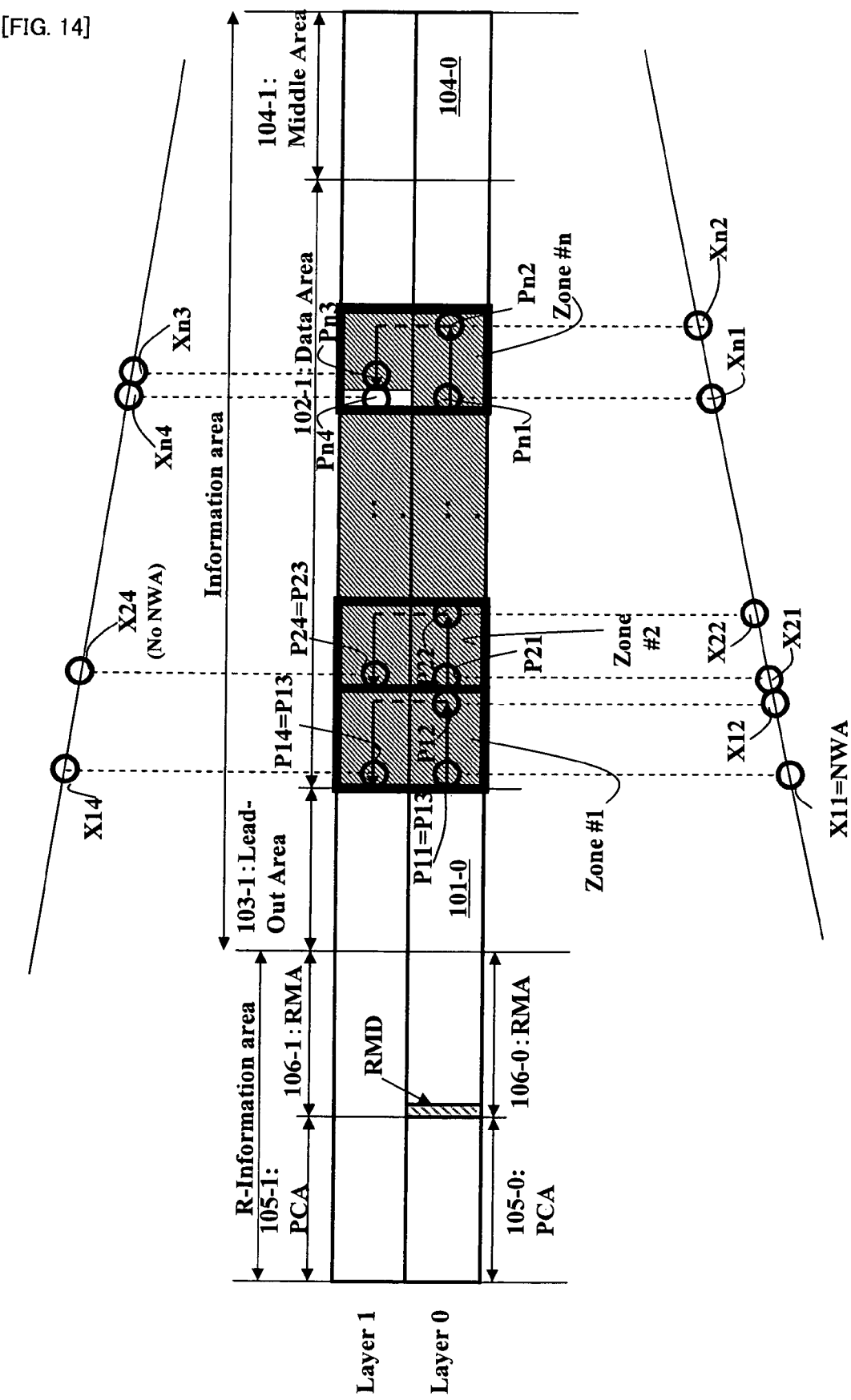
[FIG. 14]

[FIG. 15]

11: Pointer Info.
12: Zone Specification Info.

Zone Info.(10) included in RMD

| Content | Byte No. | Value of Various Info. |
|---|---|---|
| Zone No. in Not-Recognized State | 0~1 | #n |
| Zone No. in 1st Reservation Available State | 2~3 | 0 |
| Zone No. in 2nd Reservation Available State | 4~5 | 0 |
| Sector No. of $P_{11}$ | 16~19 | $X_{11}$ |
| Sector No. of $P_{12}$ | 20~23 | $X_{12}$ |
| Sector No. of $P_{13}$ | 24~27 | $X_{13}$ |
| Sector No. of $P_{14}$ | 28~31 | $X_{14}$ |
| Sector No. of $P_{21}$ | 32~35 | $X_{21}$ |
| Sector No. of $P_{22}$ | 36~39 | $X_{22}$ |
| Sector No. of $P_{23}$ | 40~43 | $X_{23}$ |
| Sector No. of $P_{24}$ | 44~47 | $X_{24}$ |
| ... | ... | ... |
| ... | ... | ... |
| ... | ... | ... |
| Sector No. of $P_{n1}$ | 16n~16n+3 | $X_{n1}$ |
| Sector No. of $P_{n2}$ | 16n+4~16n+7 | $X_{n2}$ |
| Sector No. of $P_{n3}$ | 16n+8~16n+11 | $X_{n3}$ |
| Sector No. of $P_{n4}$ | 16n+12~16n+15 | $X_{n4}$ |
| ... | ... | 0 |
| ... | ... | ... |
| Sector No. of $P_{127-4}$ | 2044~2047 | 0 |

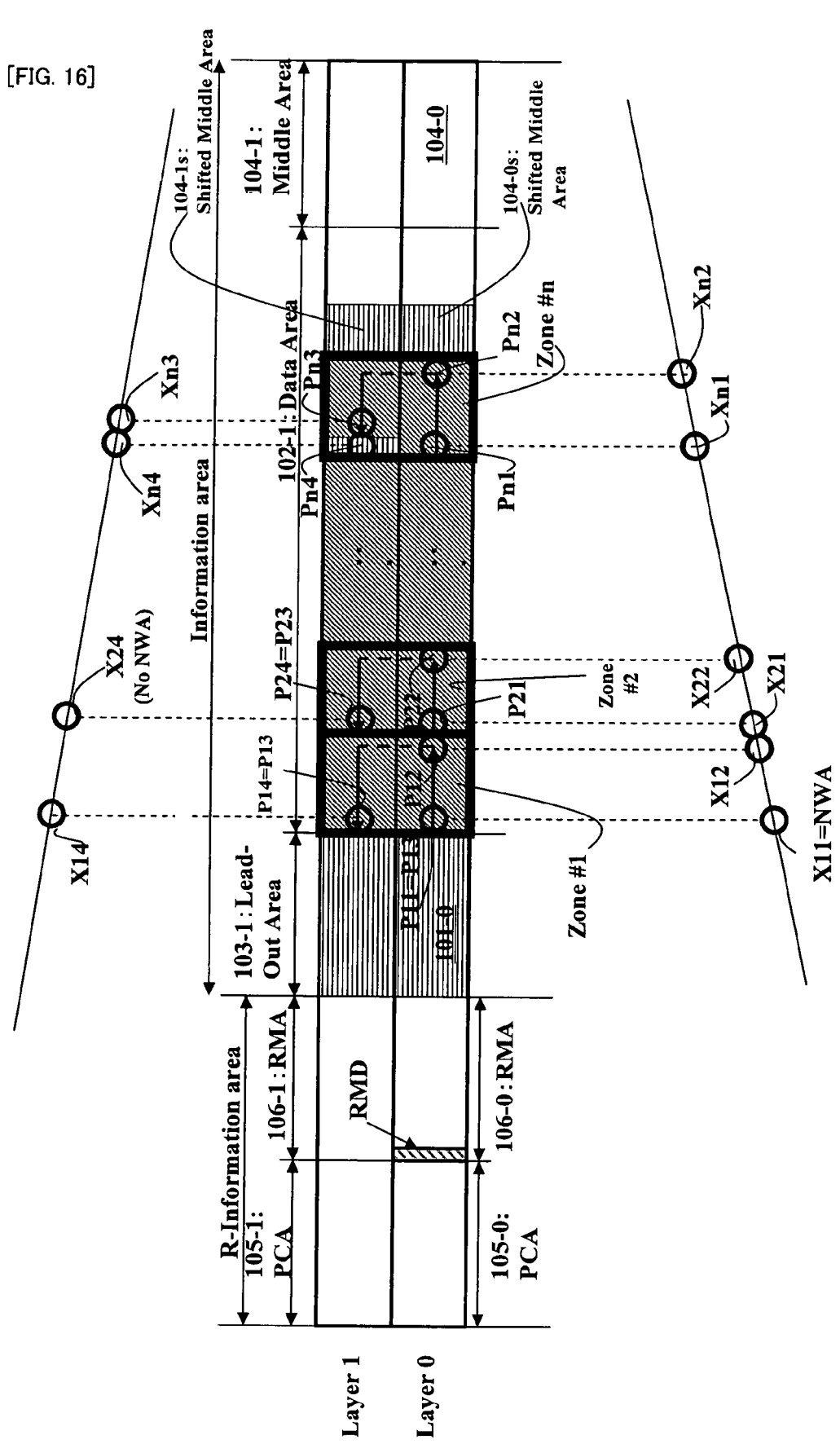
[FIG. 16]

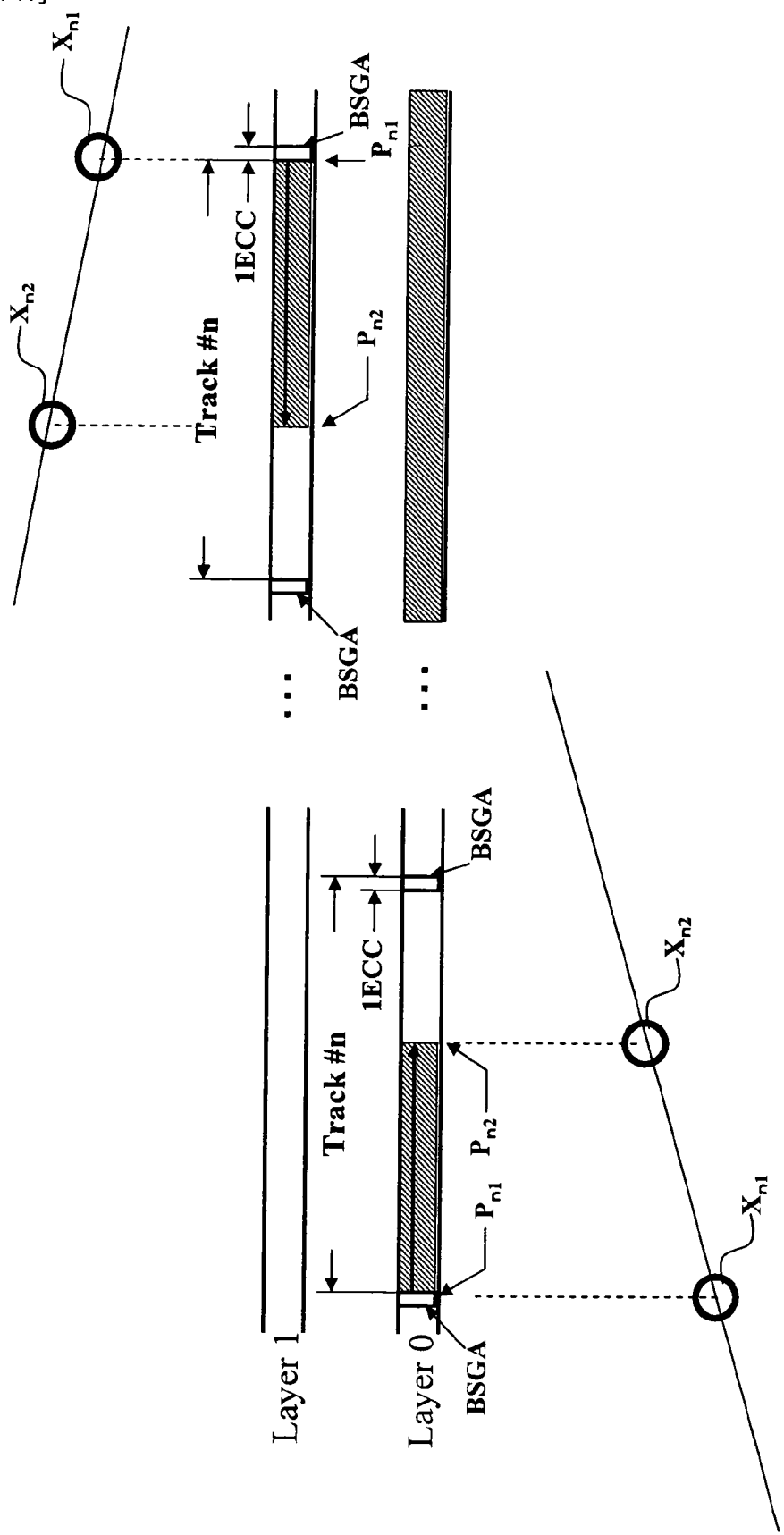

[FIG. 18]

11: Pointer Info.

12: Zone Specification Info.

Comparison Ex.:Zone Info.(10)included in RMD

| Content | Byte No. | Value of Various Info. |
|---|---|---|
| Zone No. in Not-Recognized State | 0~1 | Zone No. 11a |
| Zone No. in 1st Reservation Available State | 2~3 | Zone No. 11b |
| Zone No. in 2nd Reservation Available State | 4~5 | Zone No. 11c |
| Sector No. of $P_{11}$ | 16~19 | $X_{11}$ |
| Sector No. of $P_{12}$ | 20~23 | $X_{12}$ |
| Sector No. of $P_{21}$ | 24~27 | $X_{21}$ |
| Sector No. of $P_{22}$ | 28~31 | $X_{22}$ |
| ... | ... | ... |
| ... | ... | ... |
| ... | ... | ... |
| Sector No. of $P_{n1}$ | 16n~16n+3 | $X_{n1}$ |
| Sector No. of $P_{n2}$ | 16n+4~16n+7 | $X_{n2}$ |
| ... | ... | ... |
| ... | ... | ... |
| ... | ... | ... |
| ... | ... | ... |
| ... | ... | ... |
| ... | ... | ... |
| ... | ... | ... |
| ... | ... | ... |

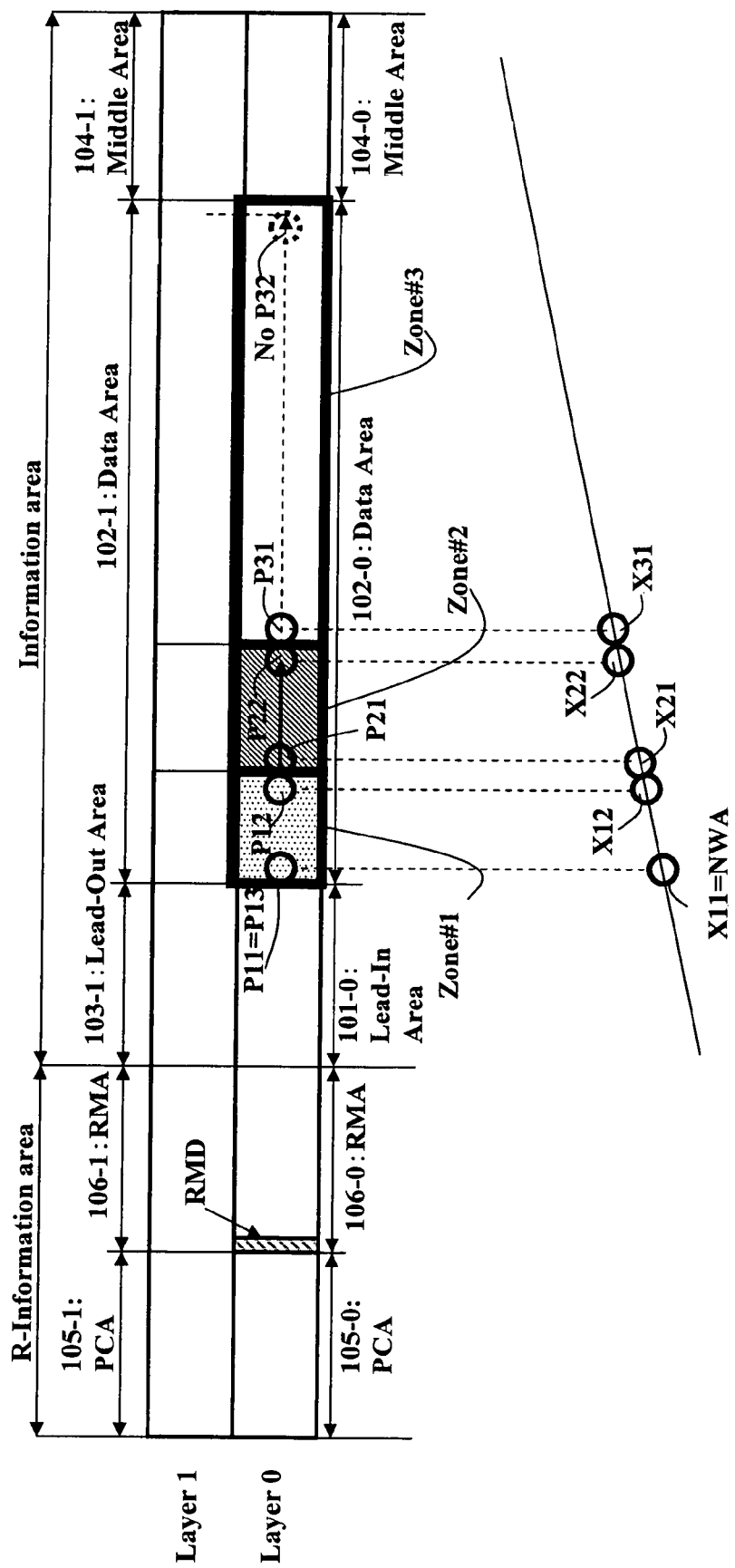
[FIG. 19]

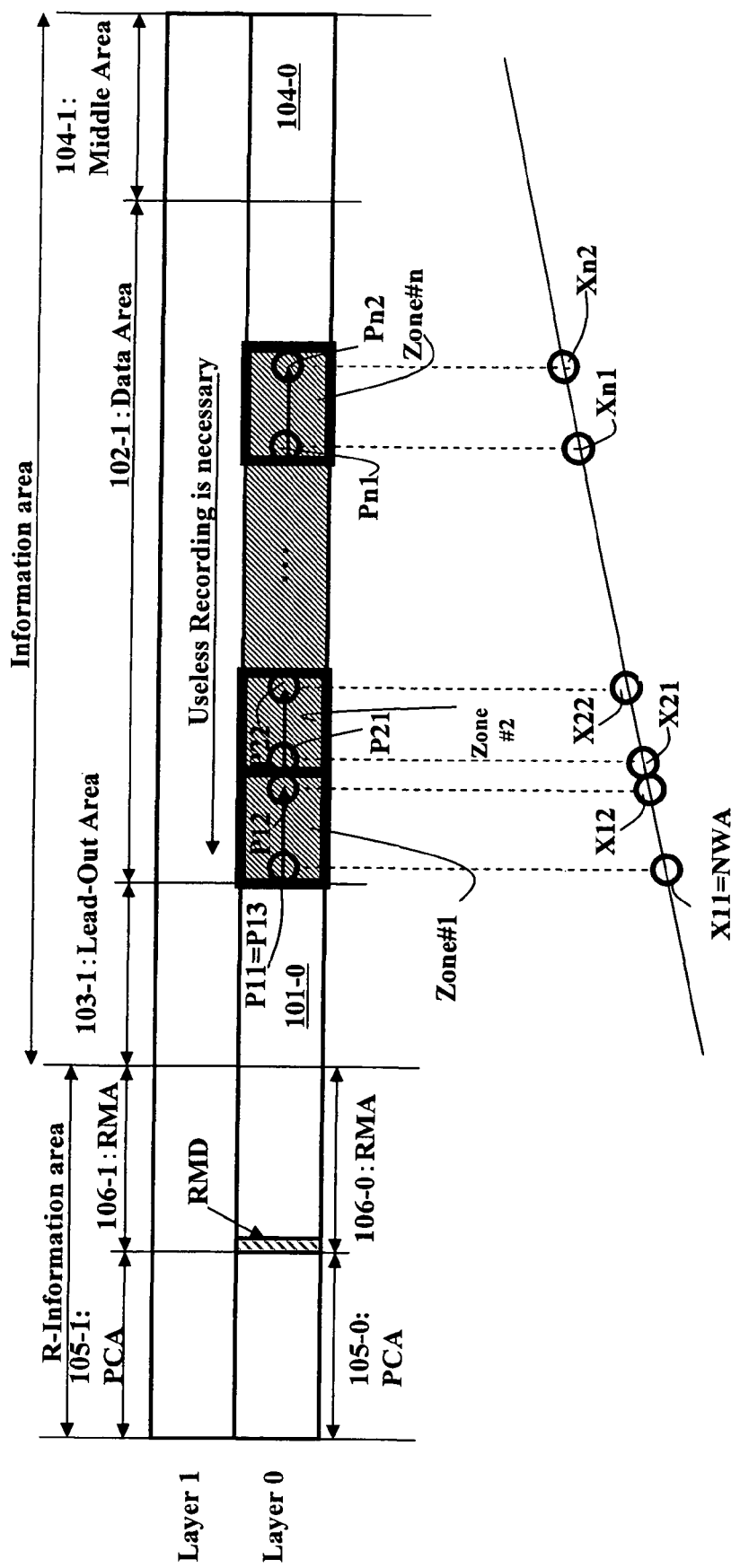
[FIG. 20]

[FIG. 21]
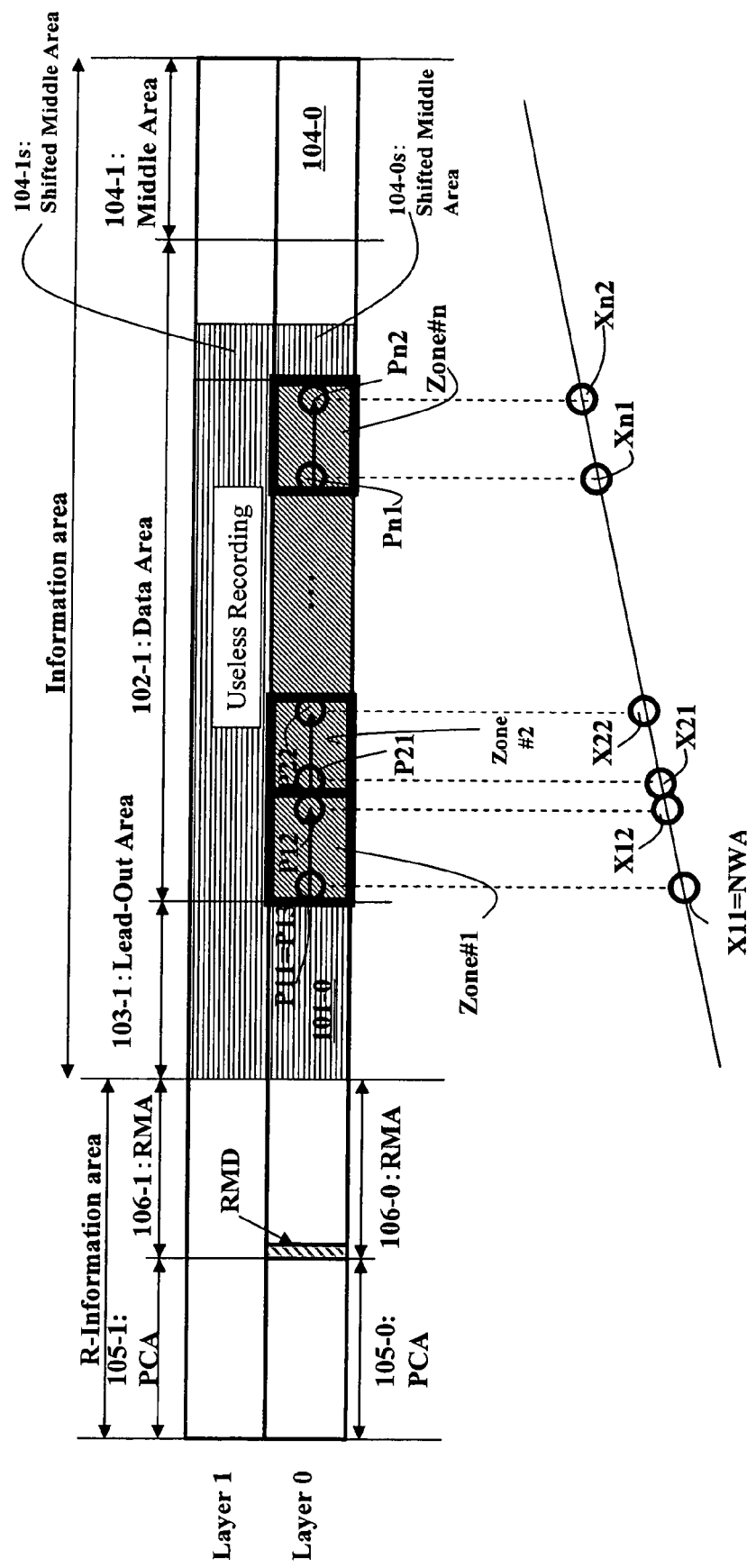

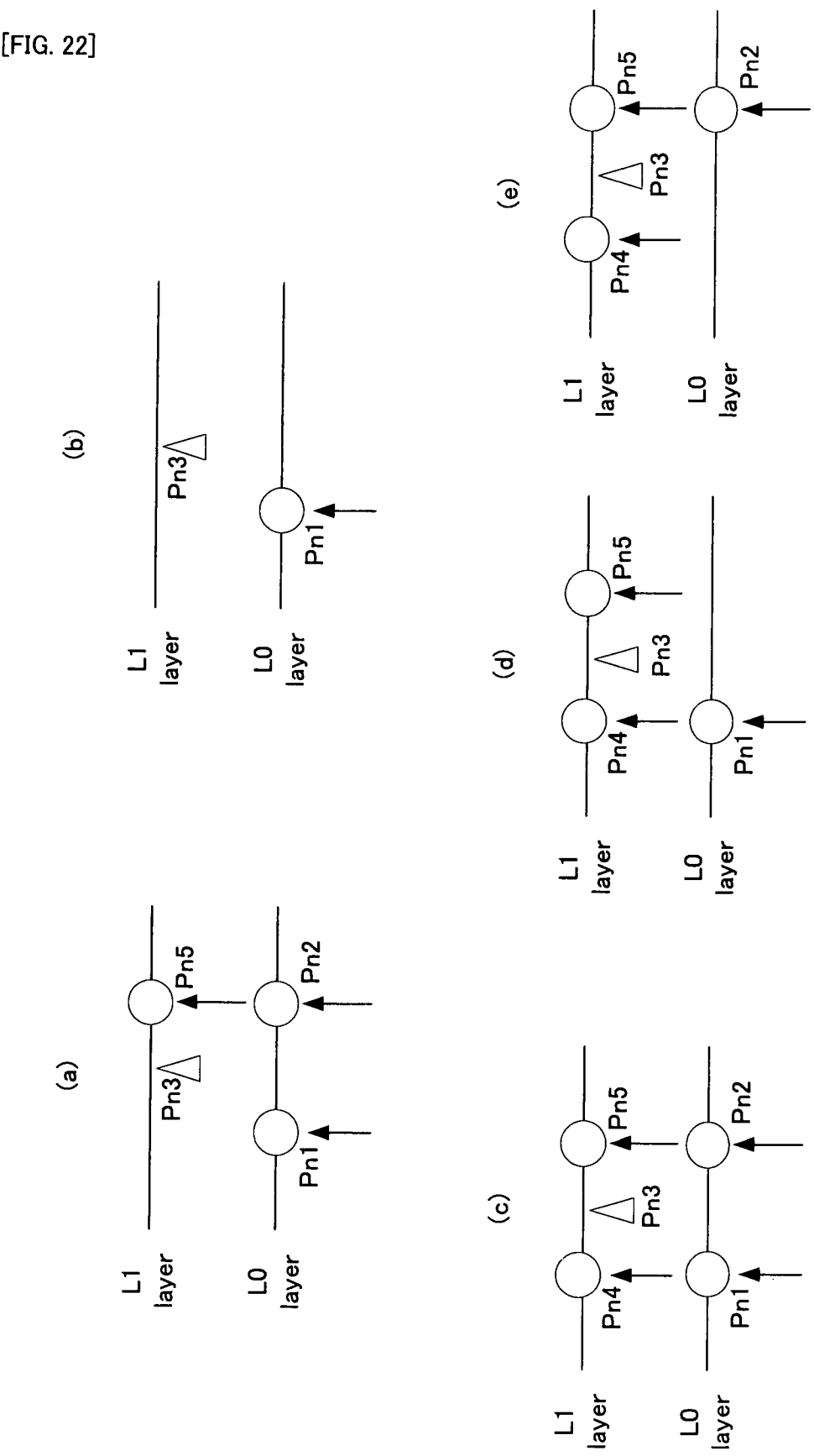
[FIG. 22]

INFORMATION RECORDING MEDIUM, APPARATUS AND METHOD FOR RECORDING INFORMATION, AND COMPUTER PROGRAM

TECHNICAL FIELD

The present invention relates to an information recording medium, such as a DVD, an information recording apparatus and method, such as a DVD recorder, and a computer program.

BACKGROUND ART

For example, in an information recording medium, such as a CD-ROM (Compact Disc-Read Only Memory), a CD-R (Compact Disc-Recordable), and a DVD-ROM, there are developed a multiple layer or multilayer type, or double layer (or dual layer or two-layer) type optical disc and so on, in which a plurality of recording layers are laminated on the same substrate. More specifically, the two-layer type optical disc has a first recording layer (referred to as a "L0 layer" in this application), as the first layer, which is located on the front (i.e. a side closer to an optical pickup) as viewed from a laser light emission side in recording information on the information recording apparatus, and further has a semitransparent reflective coating or film, located on the rear thereof (i.e. a side farther from the optical pickup). As the second recording layer, it has a second recording layer (referred to as a "L1 layer" in this application), located on the rear of the semitransparent reflective coating through a middle layer, such as an adhesive layer, and further has a reflective film located on the rear thereof. In preparing such a multilayer type information recording medium, the L0 layer and the L1 layer are individually formed and pasted in the end, to thereby prepare the two-layer type optical disc at a low cost.

In the information recording apparatus, such as a CD recorder, for recording information onto such a two-layer type optical disc, the information is recorded into the L0 layer in a rewritable method or irreversible change recording method by irreversible change recording heat by using heat or the like, by focusing the laser light for recording onto the L0 layer, and the information is recorded into the L1 layer in a rewritable method or irreversible change recording method by heat or the like, by focusing the laser light onto the L1 layer.

Patent document 1: Japanese Patent Application Laid Open NO. 2002-352469

DISCLOSURE OF INVENTION

Subject to be Solved by the Invention

In such a two-layer type optical disc, generally, at first, data (record information) is recorded into the L0 layer. After the data is recorded in the entire L0 layer, the data is recorded into the L1 layer. Therefore, there arises such a situation that the data is recorded in the entire L0 layer, while the data is recorded only in one portion of the L1 layer. If a finalize process is performed to reproduce the data on the optical disc by an existing CD-ROM player or the like in such a situation, it is necessary to record dummy data in the L1 layer in which the data is not recorded. Thus, there is a technical problem that it takes more time to perform the finalize process, as compared to the size of the data actually recorded.

It is therefore an object of the present invention to provide an information recording medium which has a plurality of recording layers and which enables a quick finalize process, as well as an information recording apparatus and method, and a computer program which makes a computer function as the information recording apparatus.

Means for Solving the Subject (Information Recording Medium)

Hereinafter, the information recording medium of the present invention will be discussed.

The above object of the present invention can be achieved by an information recording medium provided with a first recording layer (an L0 layer) in which a first recording track to record therein a record information is formed; a second recording layer (an L1 layer) in which a second recording track to record therein the record information and is formed; and a management information recording area (RMA) to record therein management information (RMD) for recording the record information, by a recording unit of a zone including one recording area of the first recording layer and another recording area of the second recording layer located in a position facing the one recording area.

According to the information recording medium of the present invention, the information recording medium is a two-layer type or multilayer type DVD or optical disc in which at least the first and second recording layers are laminated on one side of a discoshaped substrate, for example. In the first recording layer, the record information, such as audio, video information, and content information, can be recorded, along the first recording track provided with grooves (guide grooves), for example. In the second recording layer, the record information, such as audio, video information, and content information, can be recorded, along the second recording track provided with grooves (guide grooves), for example. Since the information recording medium is constructed in this manner, the substrate, the first recording layer, and the second recording layer are irradiated in this order with laser for recording or reproduction.

More specifically, in particular, the first recording track may be directed from one side to the other out of the inner and outer circumferential sides of the above-mentioned substrate, and the second recording track may be directed from the one side to the other, as in the first recording track. In other words, continuous recording can be performed in a "parallel manner" in which the recording tracks face in the same direction in the two recording layers, on the two-layer type or multilayer type information recording medium. In the parallel manner, if the recording or reproduction is ended in the first recording layer, an optical pickup, located on the most outer circumference, needs to be displaced again to the most inner circumference when the recording or reproduction is started in the second recording layer, so that it takes more time to change from the first recording layer to the second recording layer, by that much, as compare to an opposite manner. Alternatively, the first recording track may be directed from one side to the other out of the inner and outer circumferential sides of the above-mentioned substrate, and as opposed to this, the second recording track may be directed from the other side to the one side. In other words, continuous recording can be performed in the opposite manner in which the recording tracks face in the opposite direction in the two recording layers, on the two-layer type or multilayer type information recording medium. Therefore, if the recording is continuously performed from the end of the first recording layer, i.e. an end portion on the other side, such as an end on the outer circumferential side, to the start of the second recording layer, i.e. an end portion on the other side, such as an end on the outer circumferential side, it is hardly or not necessary to change, in the radial direction, the irradiation position of laser light on the substrate surface, in changing the recording layer targeted for an information recording process or information reproduction process. Thus, it is possible to perform quick layer jump (i.e. a layer change operation). This is extremely useful in practice, in the point that it facilitates uninterrupted reproduction without a special buffer function to change the recording layer, in recording the continuous record information, such as a movie.

In particular, in the present invention, the record information is recorded by the recording unit of the zone including one recording area of the first recording layer and another recording area of the second recording layer located in a position facing the one recording area. The term "facing" herein has a wide concept, including not only a case where a part of the first recording layer corresponds to a part of the second recording layer, namely, a case where that the former has an address with the same position relationship as the latter, but also a case where the former has substantially the same address as that of the latter, and further including a relationship between a part of the first recording layer and a part of the second recording layer in consideration of an eccentricity or the like. A plurality of zones are included in the information recording medium, and one zone can be specified on the basis of the management information, such as the RMD (Recording Management Data), recorded in the management information recording area, such as a RMA (Recording Management Area). If the record information is further written once or additionally recorded, following the once ended recording operation, the record information is sequentially recorded into a new zone from the inner circumferential side in each of the first and second recording layers. As described above, the record information is recorded into each zone, so that it is possible to equalize the sizes of the recording area which is already recorded in the first recording layer and the recording area which is already recorded in the second recording layer. Thus, it is possible to reduce the size of an area or eliminate the area in which the dummy data needs to be recorded in a finalize process, as compared to an information recording medium on which the record information is recorded into the second recording layer after recorded in the entire recording layer.

Consequently, according to the information recording medium of the present invention, a time length required for the finalize process is substantially equal to a time length to record the effective record information, such as the content information, so that it is possible to greatly reduce a recording time, to thereby contribute to the improvement in a user's comfortableness or the like, which is dramatically advantageous.

In one aspect of the information recording medium of the present invention, a first start address and a first end address, which respectively indicate a start position and an end position of the first recording track to specify the zone, and a border address, which indicates a border position between a recorded area and an unrecorded area of the specified zone, are recorded as the management information (RMD) into the management information recording area (RMA).

According to this aspect, it is possible to specify one zone, more certainly, by at least three parameters, such as addresses.

In another aspect of the information recording medium of the present invention, the zone is constructed to equalize a data amount of the one recording area and a data amount of the another recording area as much as possible, as compare to in random distribution, and a first start address, which indicates a start position of the first recording track to specify the zone, and a border address, which indicates a border position between a recorded area and an unrecorded area of the specified zone, are recorded as the management information (RMD) into the management information recording area (RMA).

According to this aspect, it is possible to specify one zone by at least two parameters, such as addresses, by distributing the recording area of the zone, substantially equally, into the first recording layer and the second recording layer. Thus, it is possible to reduce the data amount of the management information.

In another aspect of the information recording medium of the present invention, a first start address and a first end address, which respectively indicate a start position and an end position of the first recording track to specify the zone, a second start address, which indicates a start position of the second recording track, and a border address, which indicates a border position between a recorded area and an unrecorded area of the specified zone, are recorded as the management information (RMD) into the management information recording area (RMA).

According to this aspect, it is possible to specify one zone, more certainly, by at least four parameters, such as addresses, with little influence or without any influence of an error in the radial position, such as an eccentricity on the outer circumferential side.

In another aspect of the information recording medium of the present invention, a first start address and a first end address, which respectively indicate a start position and an end position of the first recording track to specify the zone, a second end address, which indicates an end position of the second recording track, and a border address, which indicates a border position between a recorded area and an unrecorded area of the specified zone, are recorded as the management information (RMD) into the management information recording area (RMA).

According to this aspect, it is possible to specify one zone, more certainly, by at least four parameters, such as addresses, with little influence or without any influence of an error in the radial position, such as an eccentricity on the inner circumferential side.

In another aspect of the information recording medium of the present invention, a first start address and a first end address, which respectively indicate a start position and an end position of the first recording track to specify the zone, a second start address and a second end address, which respectively indicate a start position and an end position of the second recording track, and a border address, which indicates a border position between a recorded area and an unrecorded area of the specified zone, are recorded as the management information into the management information recording area.

According to this aspect, it is possible to specify one zone, more certainly, by at least five parameters, such as addresses, with little influence or without any influence of an error in the radial position, such as eccentricities on the outer and inner circumferential sides.

In another aspect of the information recording medium of the present invention, a recording direction of the first recording track and a recording track of the second recording track are opposite.

According to this aspect, it is possible to perform quick layer jump (i.e. a layer change operation).

In another aspect of the information recording medium of the present invention, a recording direction of the first recording track and a recording track of the second recording track are equal.

According to this aspect, it is possible to construct the information recording medium by using the recording layers in which a pre-format address is recorded in the same direction.

(Information Recording Apparatus)

Hereinafter, the information recording apparatus of the present invention will be discussed hereinafter.

The above object of the present invention can be also achieved by an information recording apparatus for recording the record information onto the above-mentioned information recording medium of the present invention (including its various aspects), the information recording apparatus provided with: a recording device capable of recording the record information into at least one of the first recording layer and the second recording layer; a reading device for reading the management information from the management information recording area; and a controlling device for controlling the recording device to record the record information on the basis of the read management information.

According to the information recording apparatus of the present invention, under the control of the controlling device, such as a CPU (Central Processing Unit) of a drive or a host computer, the management information, such as the RMD, is read by the reading device, such as an optical pickup, from the information recording management area, such as the RMA. At the same time or before or after this, under the control of the controlling device, the recording device, such as an optical pickup, records the record information into the first and second recording layers, by the recording unit of the zone, on the basis of the management information.

According to the information recording apparatus of the present invention, the record information is sequentially recorded, by the recording unit of the zone, from the inner circumferential side in each of the first and second recording layers, for example. Thus, it is possible to substantially equalize the sizes of the recording area which is already recorded in the first recording layer and the recording area which is already recorded in the second recording layer.

Consequently, a time length required for the finalize process is substantially equal to a time length to record the effective record information, such as the content information, so that it is possible to greatly reduce a recording time, to thereby contribute to the improvement in a user's comfortableness or the like, which is dramatically advantageous.

In one aspect of the information recording medium of the present invention, it is further provided with: a reserving device for reserving one zone targeted for recording of the record information, and the controlling device controls the recording device to record the record information into the reserved one zone.

According to this aspect, it is possible to realize a recording manner, such as an incremental recording manner, more certainly.

In another aspect of the information recording medium of the present invention, it is further provided with: an updating device for updating the management information at a same time or before or after recording of the record information.

According to this aspect, the management information is updated more frequently, so that it is possible to specify one zone, more accurately, on the basis of the management information.

In another aspect of the information recording medium of the present invention, the information recording medium is further provided with, in the first recording layer and the second recording layer: (i) a data area including a plurality of zones; and at least one area of (ii) a fixed buffer area whose radial position is fixed; (iii) a variable buffer area which is located on an inner circumferential side of the fixed buffer area, which can be disposed adjacently to the data area, and which is variable in length; (iv) a lead-in area; and (v) a lead-out area, the both buffer areas, the lead-in area, and the lead-out area being formed by recording buffer data, which is at least one portion of the record information, in order to prevent a recording or reproduction position with respect to the first recording layer and the second recording layer from deviating to an unrecorded area, and the controlling device controls the recording device to record the buffer data to form the at least one area, in response to a finalize command with respect to the information recording medium.

According to this aspect, it is possible to perform the finalize process, more accurately, by the controlling device.

In another aspect of the information recording medium of the present invention, the information recording medium is further provided with, in the first recording layer and the second recording layer: the data area including a plurality of borders in place of or in addition to the zones; (vi) a border-in in place of or in addition to the lead-in area; and (vii) a border-out in place of or in addition to the lead-out area, and the controlling device controls the recording device to record the buffer data to form the at least one of the border-in and the border-out, in response to a border close command with respect to the information recording medium.

According to this aspect, it is possible to perform the border close process, more accurately, by the controlling device.

(Information Recording Method)

Hereinafter, the information recording method of the present invention will be discussed hereinafter.

The above object of the present invention can be also achieved by an information recording method in an information recording apparatus provided with: a recording device capable of recording the record information into at least one of the first recording layer and the second recording layer with respect to the above-mentioned information recording medium of the present invention (including its various aspects), the information recording method provided with: a reading process of reading the management information from the management information recording area; and a controlling process of controlling the recording device to record the record information on the basis of the read management information.

According to the information recording method of the present invention, it is possible to receive the various benefits owned by the above-mentioned information recording apparatus of the present invention.

Incidentally, in response to the various aspects of the information recording apparatus of the present invention described above, the information recording method of the present invention can adopt various aspects.

(Computer Program)

The above object of the present invention can be also achieved by a computer program of instructions for recording control and for tangibly embodying a program of instructions executable by a computer provided in the above-mentioned information recording apparatus of the present invention (including its various aspects), to make the computer function as at least one of the recording device, the reading device, and the controlling device.

According to the computer program of the present invention, the above-mentioned information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the information recording apparatus of the present invention described above, the computer program of the present invention can adopt various aspects.

The above object of the present invention can be also achieved by a computer program product in a computer-readable medium for tangibly embodying a program of instructions executable by a computer provided in the above-mentioned information recording apparatus of the present invention (including its various aspects), to make the computer function as at least one of the recording device, the reading device, and the controlling device.

According to the computer program product of the present invention, the above-mentioned information recording apparatus can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-mentioned information recording apparatus.

These effects and other advantages of the present invention will become more apparent from the following embodiments.

As explained above, according to the information recording medium of the present invention, it is provided with: the first recording layer; the second recording layer; and the management information recording area to record therein the management information for recording the record information by the recording unit of the zone. Therefore, it is possible to substantially equalize a time length required for the finalize process with a time length to record the effective record information, such as the content information, so that it is possible to greatly reduce a recording time, to thereby contribute to the improvement in a user's comfortableness or the like, which is dramatically advantageous.

Moreover, according to the information recording apparatus of the present invention, it is provided with the recording device, the reading device, and the controlling device. The information recording method of the present invention is provided with the reading process and the controlling process. Therefore, the record information is recorded onto the information recording medium by the recording unit of the zone, so that a time length required for the finalize process is substantially equal to a time length to record the effective record information, such as the content information. Thus, it is possible to greatly reduce a recording time, to thereby contribute to the improvement in a user's comfortableness or the like, which is dramatically advantageous.

Furthermore, according to the computer program of the present invention, it makes a computer function as the above-mentioned information recording apparatus of the present invention. Thus, it is possible to realize the recording operation and the area ensuring operation, more accurately and efficiently, with respect to the above-mentioned information recording medium of the present invention.

BRIEF DESCRIPTION OF DRAWINGS

FIG. 1 are a substantial plan view showing the basic structure of an optical disc having a plurality of recording areas in an embodiment of an information recording medium of the present invention (FIG. 1(a)), and a schematic cross sectional view of the optical disc and a corresponding conceptual diagram showing a recording area structure in the radial direction (FIG. 1(b)).

FIG. 2 is one conceptual graph showing the data structure of a two-layer type optical disc in the embodiment of the information recording medium, a physical sector number constituting an ECC block in the recording area of the optical disc, and a recording or reproducing method in an opposite manner of the optical disc.

FIG. 3 is another conceptual graph showing the data structure of the two-layer type optical disc in the embodiment of the information recording medium, the physical sector number constituting the ECC block in the recording area of the optical disc, and the recording or reproducing method in the opposite manner of the optical disc.

FIG. 4 is an enlarged schematic diagram of a data area showing one specific example of a position to specify a zone in the present invention, and an address which indicates the position.

FIG. 5 is a table showing the data structure of zone information included in an RMD constituting one example of the "management information" of the present invention.

FIG. 6 are schematic diagrams showing one and other specific examples of an additionally recordable (or writable once) recording state of the zone of the present invention.

FIG. 7 are schematic diagrams showing one and other specific examples of an additionally not-recordable (not-writable once) recording state of the zone of the present invention.

FIG. 8 is a block diagram showing the basic structure of a host computer and an information recording/reproducing apparatus in the embodiment of the information recording apparatus of the present invention, as well as a host computer.

FIG. 9 is a flowchart showing a recording operation which uses the zone as a recording unit, and a finalize process, performed by the information recording/reproducing apparatus in an embodiment of the information recording apparatus of the present invention.

FIG. 10 is a schematic diagram showing the recording areas in which a zone #1, a zone #2, or the like are recorded as a result of one recording operation by the information recording/reproducing apparatus in the embodiment of the information recording apparatus of the present invention.

FIG. 11 is a table showing one specific example of the zone information corresponding to FIG. 10.

FIG. 12 is a schematic diagram showing the recording areas in which a zone #3, a zone #4, or the like are recorded as a result of another recording operation by the information recording/reproducing apparatus in the embodiment of the information recording apparatus of the present invention.

FIG. 13 is a table showing another specific example of the zone information corresponding to FIG. 12.

FIG. 14 is a schematic diagram showing the recording areas after the recording of the record information is completed by the information recording/reproducing apparatus in the embodiment of the information recording apparatus of the present invention and a file system, such as a UDF bridge file system, is recorded, for example.

FIG. 15 is a table showing another specific example of the zone information corresponding to FIG. 14.

FIG. 16 is a schematic diagram showing the recording areas after the finalize process by the information recording/reproducing apparatus in the embodiment of the information recording apparatus of the present invention.

FIG. 17 is an enlarged schematic diagram of a data area showing one specific example of a position to specify a zone in a comparison example, and an address which indicates the position.

FIG. 18 is a table showing the data structure of zone information included in an RMD constituting one example of the "management information" of the comparison example.

FIG. 19 is a schematic diagram showing the recording areas in which a zone #1, a zone #2, or the like are recorded as a result of one recording operation by an information recording/reproducing apparatus in the comparison example.

FIG. 20 is a schematic diagram showing the recording areas after the recording of the record information is completed by the information recording/reproducing apparatus in the comparison example and a file system, such as a UDF bridge file system, is recorded, for example.

FIG. 21 is a schematic diagram showing the recording areas after the finalize process by the information recording/reproducing apparatus in the comparison example.

FIG. 22 are enlarged schematic diagrams of the data areas showing specific examples of a position to specify the zone in other embodiments of the information recording medium of the present invention.

DESCRIPTION OF REFERENCE CODES

10 . . . zone information,
11 . . . pointer information,
12 . . . zone specification information,
100 . . . optical disc,
101-0 (101-1) . . . lead-in area,
102-0 (102-1) . . . data area,
103-0 (103-1) . . . lead-out area,
104-0 (104-1) . . . middle area,
104s-0 (104s-1) . . . shift middle area,
105-0 (105-1) . . . PCA,
106-0 (106-1) . . . RMA,
300 . . . information recording/reproducing apparatus,
301 . . . optical pickup,
302 . . . signal recording/reproducing device,
305 . . . CPU (drive control device),
306 . . . spindle motor,
307 (402) . . . memory,
308(406) . . . data input/output control device,
309 (407) . . . bus,
400 . . . host computer,
401 . . . CPU (for host),
403 . . . operation control device,
404 . . . operation button,
405 . . . display panel,
LB . . . laser light

BEST MODE FOR CARRYING OUT THE INVENTION

Hereinafter, the best mode for carrying out the present invention will be discussed in order for each embodiment, with reference to the drawings.

(1) First Embodiment of Information Recording Medium

At first, with reference to FIG. 1 to FIG. 7, an embodiment of the information recording medium of the present invention will be discussed in detail. Incidentally, in the optical disc in the embodiment, an opposite manner is adopted, as one specific example of a recording manner, in which the track pass of the L0 layer constituting one example of the "first recording track" of the present invention and the track pass of the L1 layer constituting one example of the "second recording track" of the present invention have opposite recording directions.

(1-1) Basic Structure

At first, with reference to FIG. 1(a) and FIG. 1(b), the basic structure of an optical disc in the embodiment of the recording medium of the present invention will be discussed. FIG. 1(a) is a substantial plan view showing the basic structure of an optical disc having a plurality of recording areas in the embodiment of the information recording medium of the present invention, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a lead-in area 101 or a lead-out area 103; a data area 102; and a middle area 104, with a center hole 1 as the center. Then, for example, on a transparent substrate 106 of the optical disc 100, there are laminated recording layers, such as an L0 layer and an L1 layer. In each recording area of the recording layers, tracks 10, such as groove tracks and land tracks, are alternately placed, spirally or concentrically, with the center hole 1 as the center. On the track 10, data is divided and recorded by a unit of ECC block 11. The ECC block 11 is a data management unit by a preformat address in which record information is error-correctable.

Incidentally, the present invention is not particularly limited to the optical disc having these three areas. For example, even if the lead-in area 101, the lead-out area 103 or the middle area 104 does not exist, a data structure explained below can be constructed. Moreover, as described later, the lead-in area 101, the lead-out area 103 or the middle area 104 may be further segmentized.

The optical disc 100 in the embodiment, as shown in FIG. 1(b), has such a structure that the L0 layer and the L1 layer, which constitute one example of the "first and second record layers" of the present invention as descried later, respectively, are laminated on the transparent substrate 106. Upon the recording/reproduction of such a two-layer type optical disc 100, the recording/reproduction in the L0 layer or the L1 layer is performed, depending on which recording layer has the focus position of laser light LB, irradiated from the lower to upper side in FIG. 1(b). Moreover, the optical disc 100 in the embodiment is not limited to a two-layer single sided type, i.e., a dual layer type, but may be a two-layer double sided type, i.e., a dual layer double sided type. Furthermore, the optical disc 100 in the embodiment is not limited to the optical disc having the two recording layers, as described above, but may be an optical disc of a multilayer type which has three or more layers.

Incidentally, a recording/reproducing procedure in the opposite manner on the two-layer type optical disc and the data structure of each layer will be discussed later.

(1-2) Detailed Structure

Next, with reference to FIG. 2 to FIG. 4, the detailed structure of the two-layer type optical disc in the embodiment of the information recording medium of the present invention will be discussed. More specifically, with reference to FIG. 2 to FIG. 4, the data structure of the two-layer type optical disc, a physical sector number (hereinafter referred to as a "sector number", as occasion demands) constituting an ECC block in the recording area of the optical disc, and a recording or reproducing procedure in the opposite manner of the optical disc will be discussed. FIG. 2 is one conceptual graph showing the data structure of the two-layer type optical disc in the embodiment of the information recording medium, the physical sector number constituting the ECC block in the recording area of the optical disc, and the recording or reproducing method in an opposite manner of the optical disc. FIG. 3 is another conceptual graph showing the data structure of the two-layer type optical disc in the embodiment of the information recording medium, the physical sector number constituting the ECC block in the recording area of the optical disc, and the recording or reproducing method in the opposite manner of the optical disc. FIG. 4 is an enlarged schematic diagram of a data area showing one specific example of a position to specify a zone in the present invention, and an address which indicates the position. Incidentally, the vertical axis in FIG. 2 to FIG. 4 indicates the sector number expressed by hexadecimal numeral, and the horizontal axis indicates a relative position in the radial direction of the optical disc.

As shown in FIG. 2, the two-layer type optical disc 100 in the embodiment of the information recording medium of the present invention is provided with two recording layers laminated on a not-illustrated substrate, i.e. the L0 layer and the L1 layer.

Specifically, the L0 layer is provided, from the inner to the outer circumferential side, with: a power calibration area 105-0 (hereinafter referred to as a "PCA", as occasion demands) for the detection of an optimum recording power (calibration process: OPC: Optimum Power Control); a recording management area 106-0 (hereinafter referred to as an RMA, as occasion demands); a lead-in area 101-0; a data area 102-0; and a middle area 104-0. Moreover, an arrow in the PCA 105-0 shows directions of consuming the recording area for the calibration process.

In the RMA 106-0 (and 106-1 described later), it is possible to record RMD (Recording Management Data) which constitutes one example of the "management information" of the present invention. Specifically, in the RMA 106-0 (106-1), the RMD can be additionally recorded or written once, about 700 times.

The RMD may broadly include the following four types of various information; namely, (i) identification number information of an information recording/reproducing apparatus which performs a recording operation with respect to the optical disc 100, so-called drive ID information (drive identification information), (ii) numerical information of an optimum recoding power detected as a result of the calibration process by the information recording/reproducing apparatus designated by the drive ID, (iii) disc state information which indicates (iii-1) an unrecorded state, (iii-2) a state in which a finalize process, which makes the information recording media not writable once or additionally not-recordable, is already performed, or a state in which a recording manner, such as an incremental recording manner, is already performed, and the like, and (iv) zone information. Incidentally, the (iv) zone information will be discussed in detail in FIG. 5 later.

The lead-in area 101-0 is provided with a control data zone CDZ. In the control data zone CDZ, various information, such as the number of recording layers, the direction of the recording track, and a track pitch, is pre-recorded with laser light or the like, for example.

In the data area 102-0, the record information can be recorded. In particular, in the data area of the optical disc 100 in the embodiment, the record information can be recorded by a recording unit of zone in the present invention. Incidentally, the zone will be discussed in detail in FIG. 4 later.

The middle area 104-0 has a basic function to prevent a recording or reproduction position with respect to the L0 layer and the L1 layer from deviating to an unrecorded area and the outside of the substrate. It also has a function as a so-called "jump buffer area", which is to prevent, in layer jump, the recording or production position from deviating to the unrecorded area and the outside of the substrate. Incidentally, one specific example of the "fixed buffer area" of the present invention is constructed form the middle area 104-0 (and a middle area 104-1 described later).

On the other hand, the L1 layer is provided, from the outer to the inner circumferential side, with: the middle area 104-1; a data area 102-1; a lead-out area 103-1; the RMA 106-1; and a PCA 105-1. More specifically, the PCA 105-0 (105-1) and the RMA 106-0 (106-1) may be collectively referred to as an "Information Area". Moreover, the above-mentioned lead-in area 101-0 (101-1), the data area 102-0 (102-1), and the middle area 104-0 (104-1) may be collectively called as an "R-Information Area".

In particular, in the optical disc 100 in the embodiment, the outer circumferential end of the data area 102-0 (102-1) may be located on the inner circumferential side if the data amount of the record information is relatively smaller than the entire recording capacity of the optical disc, in the incremental recording manner or the like, for example, as shown in FIG. 3. In this case, in a direction to the outer circumferential side from the outer circumferential end of the data area 102-0 (102-1), there may be provided a shifted middle area 104s-0 (104s-1). Incidentally, one specific example of the "variable buffer area" of the present invention is constructed from the shifted middle area 104s-0 (104s-1).

The two-layer type optical disc 100 is constructed in the above manner, so that in the recording or reproduction of the optical disc 100, the laser light LB is irradiated from the side of a not-illustrated substrate, i.e., from the lower to the upper side in FIG. 2 and FIG. 3, by the optical pickup or the like of an information recording/reproducing apparatus in one specific example of the information recording apparatus of the present invention described later, and the focal distance thereof or the like is controlled. At the same time, the travel distance and direction in the radial direction of the optical disc 100 are controlled. By this, the data is recorded into each recording layer, or the recorded data is reproduced.

As the recording or reproduction procedure of the two-layer type optical disc in the embodiment of the information recording medium of the present invention, the opposite manner is adopted. The opposite manner herein is such a manner that the optical pickup of the information recording/reproducing apparatus described later is displaced from the inner to the outer circumferential side, i.e. in a direction of a right-pointing arrow in FIG. 2 and FIG. 3, in the L0 layer as the recording or reproducing procedure of the two-layer type optical disc, while the optical pickup is displaced from the outer to the inner circumferential side, i.e. in a direction of a left-pointing arrow in FIG. 2 and FIG. 3, in the L1 layer, to thereby perform the recording or reproduction on the two-layer type optical disc. In the opposite manner, if the recording or reproduction is ended in the L0 layer, the optical pickup, located on the most outer circumference, does not need to be displaced again to the most inner circumference when the recording or reproduction is started in the L1 layer, and it is enough if only the focal distance from the L0 layer to the L1 layer is changed. Thus, there is an advantage that a changing time from the L0 layer to the L1 layer is shorter than that in the parallel manner. This is why the opposite manner is adopted in the recording of large volumes of content information.

Specifically, as shown in the graph part of FIG. 2, at first, in the L0 layer, as the optical pickup is displaced in the lead-in area 101-0, the data area 102-0, and the middle area 104-0, from the inner to the outer circumferential side, the sector number in the recording area of the optical disc 100 increases. More specifically, the optical pickup sequentially accesses the end position of the lead-in area 101-0 with a sector number of "02FFFFh" (refer to an A point in FIG. 2), the start position of the data area 102-0 with a sector number of "030000h" (refer to a B point in FIG. 2), and the end position of the data area 102-0 with a sector number of "1AFFFFh" (hereinafter referred to as a "turn-around point" in the L0 layer, as occasion demands: refer to a C point in FIG. 2), and the optical pickup is displaced to the middle area 104-0 which functions as the buffer, by which the recording or reproduction is performed in the L0 layer. Incidentally, in the embodiment, "h" which is the end of "30000h" or the like indicates that it is expressed by hexadecimal numeral. On the other hand, in the L1 layer, specifically, as the optical pickup is displaced in the middle area 104-1, the data area 102-1, and the lead-out area 103-1 from the outer to the inner circumferential side, the sector number in the recording area of the optical disc 100 increases. More specifically, the optical pickup sequentially accesses the middle area 104-1 which functions as the buffer, the start position of the data area 102-1 with a sector number of "E50000h" (hereinafter referred to as a "turn-around point" in the L1 layer, as occasion demands: refer to a D point in FIG. 2), and the end position of the data area 102-1 with a sector number of "FCFFEFh" (refer to an E point in FIG. 2), and the optical pickup is displaced to the lead-out area 103-1, by which the recording or reproduction is performed in the L1 layer.

All the sector numbers in the L0 layer and the L1 layer explained above have a 15's complement number relationship in the hexadecimal numeral. More specifically, the turn-around point in the L0 layer (the sector number of "1AFFFFh") and the turn-around point in the L1 layer (the sector number of "E50000h") have the 15's complement number relationship. As a formal matter, the complement number of the "1AFFFFh" is obtained by converting the sector number of "1AFFFFh" in the hexadecimal numeral to a binary number of "000110101111111111111111", inverting the bits to "111001010000000000000000", and reconverting it to the "E50000h" in the hexadecimal numeral.

Thus, the record information, such as content, is recorded or reproduced at the same time that the optical pickup is continuously displaced, in the sector numbers of "030000h" to "1AFFFFh" of the data area 102-0 in the L0 layer and the sector numbers of "E50000h" to "FCFFEFh" of the data area 102-1 in the L1 layer, for example.

With respect to the physical sector number explained above, a Logical Block Address (LBA) is assigned or allocated, one to one. More specifically, for example, a "000000" LBA corresponds to the sector number of "030000h", and a "17FFFF" LBA corresponds to the sector number of "1AFFFFh". Moreover, a "180000" LBA corresponds to the sector number of "E50000h", and a "2FFFEF" LBA corresponds to the sector number of "FCFFEFh". Thus, for example, a host computer can perform the recording and reproduction operations in accordance with the logical block address managed by a file system, for example, without aware of the physical sector number.

In particular, in the data areas 102-0 and 102-1 of the optical disc 100 in the embodiment, as shown in FIG. 4, a zone or zones are bridged and provided over the two layers. Incidentally, in the embodiment, a plurality of zones provided for the data area 102-0 (102-1) is expressed by a "zone #n" (wherein "n" is a natural number).

The zone #n in the embodiment can be specified with the following four points. The four points may be (i) a point Pn1 (sector number: Xn1) which indicates the start position of the zone #n in the L0 layer, (ii) a point Pn2 (sector number: Xn2) which indicates the end position of the zone #n in the L0 layer, (iii) a point Pn3 (sector number: Xn3) which indicates a border or boundary position between the recorded area and the unrecorded area in the present invention, and (iv) a point Pn4 (sector number: Xn4) which indicates the end position of the zone #n in the L1 layer.

Specifically, there may be provided a BSGA (Block SYNC Guard Area) on the inner circumferential side of the point Pn1, and on the outer circumferential side of a point F which indicates the start position of the zone in the L1 layer (an address indicating the point F may have a complement number relationship with an address indicating the point Pn2 in the zone). The "BSGA" herein is a recording area in which a synchronization signal (a so-called first SY0 signal) to accurately realize various servo in accurately reading the record information is recorded by the ECC block unit, for example, by the information recording/reproducing apparatus described later. Moreover, the border position in the present invention can be present in the L0 layer or the L1 layer in the zone #n. Moreover, the border position may indicate an already-recorded position, and a position in the unrecorded area in which the information can be recorded from now, i.e. a position specified by a so-called NWA (Next Writable Address). Incidentally, one example of the "border address" of the present invention is constructed from the NWA. The NWA can be expressed by the sector number or the like, for example.

The RMD, constituting one example of the "management information" of the present invention, may include information which indicates the above-mentioned sector numbers Xn1 to Xn4, as the zone information, in order to specify the zone #n.

Now, with reference to FIG. 5, the data structure of the zone information included in the RMD in the embodiment will be discussed in detail. FIG. 5 is a table showing the data structure of the zone information included in the RMD constituting one example of the "management information" of the present invention. Incidentally, in FIG. 5, the first row indicates the content of various information, the second row indicates a byte number, and the third row indicates the values of the various information.

As shown in FIG. 5, zone information 10 included in the RMD is provided with: (i) pointer information 11 which indicates at most three points at which the recording can be started, currently, on the optical disc 100; and (ii) zone specification information 12 which specifies the zone. Specifically, the data amount of the zone information included in the RMD may be "2048 bytes".

The pointer information 11 is provided with: a zone number 11a which indicates a zone in a "not-recognized state" which is one specific example of the recording state of the zone in the present invention; a zone number 11b which indicates a zone in a "first reservation available state" which is another specific example of the recording state of the zone in the present invention; and a zone number 11c which indicates a zone in a "second reservation available state" which is another specific example of the recording state of the zone in the present invention.

Now, with reference to FIG. 6 and FIG. 7, the one and other specific examples of the recording state of the zone in the present invention will be discussed in detail. FIG. 6(a) to FIG. 6(d) are schematic diagrams showing one and other specific examples of an additionally recordable (or writable once) recording state of the zone of the present invention. FIG. 7(a) to FIG. 7(c) are schematic diagrams showing one and other specific examples of an additionally not-recordable (not-writable once) recording state of the zone of the present invention.

As shown in FIG. 6(a), in a zone in a "not-recognized state", which is one specific example of the additionally recordable (or writable once) recording state of the zone of the present invention (this state is referred to as an "open recording state", as occasion demands), the start position of the zone can be recognized by the information recording apparatus described later. Moreover, the start position of the zone matches the position which is shown by the NWA and at which the record information can be recorded. In other words, an LRA (Last Recorded Address) which can express the data amount of the record information by a logical block unit, for example, is "0". Therefore in the zone, the record information is not recorded, and the data amount of the zone is "0". On the other hand, the end position of the data is not defined and cannot be recognized by the information recording apparatus.

As shown in FIG. 6(b), in a zone in an "incomplete state", which is another specific example of the additionally recordable (or writable once) recording state of the zone of the present invention, the start position of the zone can be recognized by the information recording apparatus. Moreover, the start position of the zone differs from the position which is shown by the NWA and at which the record information can be recorded. In other words, it is possible to show the data amount of the zone by the value of the LRA. On the other hand, the end position of the data is not defined and cannot be recognized by the information recording apparatus.

As shown in FIG. 6(c), in a zone in a "wholly reservation available state" in the L0 layer and the L1 layer, which is another specific example of the additionally recordable (or writable once) recording state of the zone of the present invention, the start position of the zone can be recognized by the information recording apparatus. Moreover, the start position of the zone matches the position which is shown by the NWA and at which the record information can be recorded. In other words, the LRA which can express the data amount of the record information by the logical block unit, for example, is "0". Therefore in the zone, the record information is not recorded, and the data amount of the zone is "0". On the other hand, the end position of the data is defined and can be recognized by the information recording apparatus.

As shown in FIG. 6(d), in a zone in a "partially reservation available state" in the L0 layer and the L1 layer, which is another specific example of the additionally recordable (or writable once) recording state of the zone of the present invention, the start position of the zone can be recognized by the information recording apparatus. Moreover, the start position of the zone differs from the position which is shown by the NWA and at which the record information can be recorded. In other words, it is possible to show the data amount of the zone by the value of the LRA. On the other hand, the end position of the data is defined and can be recognized by the information recording apparatus.

As shown in FIG. 7(a), in a zone in a "wholly reservation unavailable state" in the L0 layer and the L1 layer, which is one specific example of the additionally not-recordable (or not-writable once) recording state of the zone of the present invention (this state is referred to as an "close recording state", as occasion demands), the start position of the zone can be recognized by the information recording apparatus. Moreover, there is no NWA in the zone. Furthermore, the LRA is "0". Therefore, in the zone, the record information is not recorded, and the data amount of the zone is "0". On the other hand, the end position of the data is defined and can be recognized by the information recording apparatus.

As shown in FIG. 7(b), in a zone in a "partially reservation unavailable state" in the L0 layer and the L1 layer, which is another specific example of the additionally not-recordable (or not-writable once) recording state of the zone of the present invention, the start position of the zone can be recognized by the information recording apparatus. Moreover, there is no NWA in the zone. Furthermore, it is possible to show the data amount of the zone by the value of the LRA. On the other hand, the end position of the data is defined and can be recognized by the information recording apparatus.

As shown in FIG. 7(c), in a zone in a "complete state" in the L0 layer and the L1 layer, which is another specific example of the additionally not-recordable (or not-writable once) recording state of the zone of the present invention, the start position of the zone can be recognized by the information recording apparatus. Moreover, there is no NWA in the zone. Moreover, the value of the LRA matches the data amount of the zone. On the other hand, the end position of the data is defined and can be recognized by the information recording apparatus.

Back in FIG. 5 again, as described above, the zone information 10 included in the RMD is provided with the following three information, as the pointer information 11, in order to indicate the at most three points at which the recording can be started, currently, on the optical disc 100. In other words, it is provided with: (i) the zone number 11a which indicates a zone in the "not-recognized state"; (ii) the zone number 11b which indicates a zone in the "first reservation available state"; and (iii) the zone number 11c which indicates a zone in the "second reservation available state". Specifically, the pointer information 11 can be recorded into a field with byte numbers of "0 to 5".

More specifically, in the field with byte numbers of "0 to 1", i.e., in the first two byte field, the zone number 11a which indicates a zone in the "not-recognized state" can be recorded. In the field with byte numbers of "2 to 3", i.e., in the following two byte field, the zone number 11b which indicates a zone in the "first reservation available state" can be recorded. In the field with byte numbers of "4 to 5", i.e., in the further following two byte field, the zone number 11c which indicates a zone in the "second reservation available state" can be recorded.

In addition, as described above, on the optical disc 100, the zone information 10 included in the RMD is provided with the zone specification information 12 in order to specify one zone out of a plurality of zones. Specifically, the zone specification information 12 can be recorded into a field with sector numbers of "16 to 2047".

More specifically, in the field with byte numbers of "16 to 19", i.e., in the field holding a data amount of 4 bytes, a sector number "X11" of a point P11 which indicates the start position of a zone #1 in the L0 layer can be recorded. Incidentally, the field with byte numbers of "6 to 15" may be reserved. In the field with byte numbers of "20 to 23", i.e., in the field holding a data amount of 4 bytes, a sector number "X12" of a point P12 which indicates the end position of the zone #1 in the L0 layer can be recorded. In the field with byte numbers of "24 to 27", i.e., in the field holding a data amount of 4 bytes, a sector number "X13" of a point P13 which indicates the border position in the zone #1 can be recorded. In the field with byte numbers of "28 to 31", i.e., in the field holding a data amount of 4 bytes, a sector number "X14" of a point P14 which indicates the end position of the zone #1 in the L1 layer can be recorded.

In the same manner, one zone out of the plurality of zones can be specified by a unit of 16 bytes. This is generalized as follows, wherein "n" is a natural number.

In a field with byte numbers of "16n to 16n+3", i.e., in the field holding a data amount of 4 bytes, the sector number "Xn1" of the point Pn1 which indicates the start position of the zone #n in the L0 layer can be recorded. In a field with byte numbers of "16n+4 to 16n+7", i.e., in the field holding a data amount of 4 bytes, the sector number "Xn2" of a point Pn2 which indicates the end position of the zone #n in the L0 layer can be recorded. In a field with byte numbers of "16n+8 to 16n+11", i.e., in the field holding a data amount of 4 bytes, the sector number "Xn3" of the point Pn3 which indicates the border position in the zone #n can be recorded. In a field with byte numbers of "16n+12 to 16n+15", i.e., in the field holding a data amount of 4 bytes, the sector number "Xn4" of the point Pn4 which indicates the end position of the zone #n in the L1 layer can be recorded.

(2) First Embodiment of Information Recording Apparatus

Next, with reference to FIG. 8 to FIG. 16, the structure and operation of the embodiment of the information recording apparatus of the present invention will be discussed in detail. In particular, the first embodiment is an example in which the information recording apparatus of the present invention is applied to an information recording/reproducing apparatus for the optical disc.

(2-1) Basic Structure

At first, with reference to FIG. 8, the basic structure of an information/reproducing apparatus 300 in the embodiment of the information recording apparatus of the present invention, and a host computer 400 will be discussed. FIG. 8 is a block diagram showing the information recording/reproducing apparatus in the embodiment of the information recording apparatus of the present invention, and the host computer. Incidentally, the information recording/reproducing apparatus 300 has a function of recording the record data onto the optical disc 100 and a function of reproducing the record data recorded on the optical disc 100.

With reference to FIG. 8, the inner structure of information recording/reproducing apparatus 300 will be discussed. The information recording/reproducing apparatus 300 is an apparatus for recording the information onto the optical disc 100 and reading the information recorded on the optical disc 100, under the control of a CPU (Central Processing Unit) 305 for the drive.

The information recording/reproducing apparatus 300 is provided with: the optical disc 100; an optical pickup 301; a signal recording/reproducing device 302; an address detection device 303; an address operation device 304; the CPU (drive control device) 305; a spindle motor 306; a memory 307; a data input/output control device 308; and a bus 309.

The host computer 400 is provided with: a CPU (host control device) 401; a memory 402; an operation control device 403; an operation button 404; a display panel 405; a data input/output control device 406; and a bus 407.

In particular, the information recording/reproducing apparatus 300 may be constructed to communicate with an external network by containing the host computer having a communication device, such as a modem, in the same housing. Alternatively, the CPU (host control device) 401 of the host computer 400 having a communication device, such as an i-link, may directly control the information recording/reproducing apparatus 300 through the data input/output control device 308 and the bus 309, to thereby communicate with the external network.

The optical pickup 301 is to perform the recording/reproduction with respect to the optical disc 100, and is provided with a semiconductor laser device, a lens, and the like. More specifically, the optical pickup 301 irradiates the optical disc 100 with a light beam, such as a laser beam, as reading light with a first power upon reproduction, and as writing light with a second power upon recording, with it modulated.

The signal recording/reproducing device 302 controls the optical pickup 301 and the spindle motor 306, to thereby perform the recording/reproduction with respect to the optical disc 100. More specifically, the signal recording/reproducing device 302 is provided with: a laser diode (LD) driver; a head amplifier; and the like, for example. The laser diode driver (LD driver) drives a not-illustrated semiconductor laser device located in the optical pickup 301. The head amplifier amplifies the output signal of the optical pickup 301, i.e. the reflective light of a light beam, and outputs the amplified signal. More specifically, the signal recording/reproducing device 302 drives the not-illustrated semiconductor laser device located in the optical pickup 301, in order to determine an optimum laser power by the recording and reproduction processes for an OPC (Optimum Power Control) pattern, together with a not-illustrated timing generator or the like, under the CPU 305, upon an OPC process. In particular, the signal recording/reproducing device 302 constitutes one example of the "recording device", together with the optical pickup 301.

The CPU (drive control device) 305 controls the entire information recording/reproducing apparatus 300 by giving an instruction to various controlling devices, through the bus 357. Moreover, software or firmware for operating the CPU 305 is stored in the memory 307. In particular, the CPU 305 is one specific example of the "controlling device" of the present invention.

The spindle motor 306 is intended to rotate and stop the optical disc 100, and operates upon accessing the optical disc. More specifically, the spindle motor 306 is constructed to rotate and stop the optical disc 100 at a predetermined speed, under spindle servo from a not-illustrated servo unit or the like.

The memory 307 is used in the whole data processing and the OPC process or the like on the information recording/reproducing apparatus 300, including a buffer area for the record/reproduction data, an area used as an intermediate buffer when data is converted into the data that can be used on the signal recording/reproducing device 302, and the like. Moreover, the memory 307 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like.

The data input/output control device 308 controls the input/output of the data from the exterior with respect to the information recording/reproducing apparatus 300, to thereby perform storage to and export from the data buffer on the memory 307. A drive control command issued from the external host computer 400 (hereinafter referred to as a "host", as occasion demands) connected to the information recording/reproducing apparatus 300 through an interface, such as a SCSI and an ATAPI, is transmitted to the CPU 305 through the data input/output control device 308. Moreover, the record/reproduction data is also transmitted and received with respect to the host computer 400 through the data input/output control device 308, in the same manner.

The CPU (host control device) 401, the memory 402, the data input/output control device 406, and the bus 407 in the host computer 400 are substantially the same as the corresponding constitutional elements in the information recording/reproducing apparatus 300.

In particular, the operation control device 403 receives an operation instruction and performs display with respect to the host computer 400, and transmits an instruction by the operation button 404, such as an instruction to record or reproduce, to the CPU 401. The CPU 401 may transmit a control command to the information recording/reproducing apparatus 300, through the data input/output control device 406, on the basis of instruction information from the operation control device 403, to thereby control the entire information recording/reproducing apparatus 300. In the same manner, the CPU 401 can transmit a command for requesting the information recording/reproducing apparatus 300 to transmit an operational state to the host, with respect to the information recording/reproducing apparatus 300. By this, the operational state of the information recording/reproducing apparatus 300, such as during recording and during reproduction, can be recognized, so that the CPU 401 can output the operational state of the information recording/reproducing apparatus 300 to the display panel 405, such as a fluorescent tube and an LCD, through the operation control device 403.

One specific example used by combining the information recording/reproducing apparatus 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 402, on the CPU 401. Moreover, in another specific example, the information recording/reproducing apparatus 300 is a disc drive (hereinafter referred to as a "drive", as occasion demands), and the host computer 400 is a personal computer and a work station. The host computer, such as the personal computer, and the drive are connected through the data input/output control device 308 (406), such as the SCSI and the ATAPI, and application, such as writing software, installed in the host computer controls the disc drive.

(2-2) Operation Principle

Next, with reference to FIG. 9 to FIG. 16, and the above-mentioned FIG. 8, as occasion demands, the operation principle of the information recording/reproducing apparatus in the first embodiment of the information recording apparatus of the present invention will be discussed. FIG. 9 is a flowchart showing a recording operation which uses the zone as a recording unit, and a finalize process, performed by the information recording/reproducing apparatus in the embodiment of the information recording apparatus of the present invention. FIG. 10 is a schematic diagram showing the recording areas in which a zone #1, a zone #2, or the like are recorded as a result of one recording operation by the information recording/reproducing apparatus in the embodiment of the information recording apparatus of the present invention. FIG. 11 is a table showing one specific example of the zone information corresponding to FIG. 10. FIG. 12 is a schematic diagram showing the recording areas in which a zone #3, a zone #4, or the like are recorded as a result of another recording operation by the information recording/reproducing apparatus in the embodiment of the information recording apparatus of the present invention. FIG. 13 is a table showing another specific example of the zone information corresponding to FIG. 12. FIG. 14 is a schematic diagram showing the recording areas after the recording of the record information is completed by the information recording/reproducing apparatus in the embodiment of the information recording apparatus of the present invention and a file system, such as a UDF bridge file system, is recorded, for example. FIG. 15 is a table showing another specific example of the zone information corresponding to FIG. 14. FIG. 16 is a schematic diagram showing the recording areas after the finalize process by the information recording/reproducing apparatus in the embodiment of the information recording apparatus of the present invention. Incidentally, if the sector numbers and zone numbers or the like are the same in the above-mentioned drawings, they carry the same numeral references, and the explanation thereof will be omitted.

As shown in FIG. 9, if the optical disc 100 is loaded, the management information, such as the RMD, is obtained as an initial operation, by the reading device, such as the optical pickup 301 and the signal recording/reproducing device 302, under the control of the controlling device, such as the CPU 305 (step S101).

Then, under the control of the controlling device, such as the CPU 305, it is judged whether or not the optical disc 100 is in the unrecorded state, on the basis of the obtained management information, such as the RMD (step S102). If the optical disc 100 is in the unrecorded state (the step S102: Yes), the RMD in the initial state determined in advance is recorded into the RMA 106-0 (106-1) (step S103). On the other hand, as a result of the judgment in the step S102, if the optical disc 100 is not in the unrecorded state (the step S102: No), the newest RMD is obtained from the RMA 106-0 (106-1).

Then, under the control of the controlling device, such as the CPU 305, it is judged whether or not the recording state of the zone is changed (step S105). Specifically, in the recording with respect to a predetermined zone, it is judged whether or not a "RESERVE TRACK/RZONE command" is issued from the host computer or the like, for example, in order to set the predetermined zone to be in the "wholly reservation available state (refer to FIG. 6(c))" or the "partially reservation available state (refer to FIG. 6(d))". Alternatively, it is judged whether or not a "CLOSE TRACK/RZONE/SESSION/BORDER command" is issued from the host computer or the like, for example, in order to set the predetermined zone to be in the "wholly reservation unavailable state (refer to FIG. 7(a))" or the "partially reservation unavailable state (refer to FIG. 7(b))".

If the recording state of the zone is changed (the step S105: Yes), the updated RMD is recorded into the RMA 106-0 (106-1) (step S106). On the other hand, if the recording state of the zone is not changed (the step S105: No), the step S106 is omitted.

Then, under the control of the controlling device, such as the CPU 305, it is judged whether or not the record information is recorded by the recording unit of zone (step S107). If the record information is recorded by the recording unit of zone (the step S107: Yes), the recording operation is performed, for example, in an incremental recording manner, with respect to a desired zone (step S108). Specifically, for example, a "WRITE command" may be issued, and the updated RMD may be recorded into the RMA 106-0 (106-1) at each time of the recording operation. On the other hand, if the record information is not recorded by the recording unit of zone (the step S107: No), the step S108 is omitted.

Then, under the control of the controlling device, such as the CPU 305, it is judged whether or not the record information is reproduced (step S109). If the record information is reproduced (the step S109: Yes), the reproduction operation is performed, under the control of the controlling device, such as the CPU 305 (step S110). If the record information is not reproduced (the step S109: No), the step S110 is omitted.

Then, under the control of the controlling device, such as the CPU 305, it is judged whether or not a finalize process is performed (step S111). If the finalize process is not performed (the step S111: No), the operational flow returns to the above-mentioned step S105.

By repeating the above-mentioned step S105 to step S115 in the above manner, a series of process of the recording operation by the recording unit of zone or the reproduction operation of reproducing the record information is repeated.

More specifically, as a result of one recording operation by the recording unit of zone, as shown in FIG. 10, the "zone #1" in the "wholly reservation available state (refer to FIG. 6(c))" and the "zone #2" in the "complete state (refer to FIG. 7(c))" are recorded in the data areas 102-0 and 102-1. Moreover, the "zone #3" in the "not-recognized state (refer to FIG. 6(a))" is recorded on the outer circumferential side of the "zone #2". Incidentally, in FIG. 10 (as in FIG. 12, FIG. 14, FIG. 16, FIG. 19, FIG. 20, and FIG. 21 described later), an "area shown by dots" indicates an area in which the reservation is made in the present invention, and an "area shown by right diagonal lines" indicates an area in which the record information is already recorded.

Moreover, FIG. 11 shows one specific example of the zone information 10 corresponding to the recording areas shown in FIG. 10. More specifically, as described above, the zone information 10 included in the RMD is provided with the following three information, as the pointer information 11, in order to indicate the at most three points at which the recording can be started, currently, on the optical disc 100. In other words, it is provided with information about: (i) "#3" which is the zone number 11a which indicates a zone in the "not-recognized state"; (ii) "#1" which is the zone number 11b which indicates a zone in the "first reservation available state"; and (iii) "0" which is the zone number 11c which indicates a zone in the "second reservation available state". Incidentally, if the value of the information is recorded as "0", this information may be not present or may be not defined.

Moreover, on the optical disc 100, the zone information 10 included in the RMD is provided with the zone specification information 12, in order to specify the "zone #1" in the wholly reservation available state, the "zone #2" in the complete state, and the "zone #3" in the not-recognized state.

With respect to the "zone #1" in the wholly reservation available state, more specifically, in the field with byte numbers of "16 to 19", a sector number "X1" of a point P11 which indicates the start position of the zone #1 in the L0 layer is recorded. In the field with byte numbers of "20 to 23", a sector number "X12" of a point P12 which indicates the end position of the zone #1 in the L0 layer is recorded. In the field with byte numbers of "24 to 27", a sector number "X1" of the point P11 which indicates the border position in the zone #1, i.e. the sector number "X11" shown by the NWA, is recorded. Incidentally, the "X11" shows the first one of the at most three points at which the recording can be started. In the field with byte numbers of "28 to 31", a sector number "X14" of a point P14 which indicates the end position of the zone #1 in the L1 layer is recorded.

With respect to the "zone #2" in the complete state, more specifically, in the field with byte numbers of "32 to 35", a sector number "X21" of a point P21 which indicates the start position of the zone #2 in the L0 layer is recorded. In the field with byte numbers of "36 to 39", a sector number "X22" of a point P22 which indicates the end position of the zone #2 in the L0 layer is recorded. In the field with byte numbers of "40 to 43", a sector number "X24" of a point P23 (matching a point P24) which indicates the border position in the zone #2, i.e. the sector number "X24" shown by the NWA, is recorded. In the field with byte numbers of "44 to 47", a sector number "X24" of the point P24 which indicates the end position of the zone #2 in the L1 layer is recorded.

With respect to the "zone #3" in the not-recognized state, more specifically, in the field with byte numbers of "48 to 51", a sector number "X31" of a point P31 which indicates the start position of the zone #3 in the L0 layer is recorded. In the field with byte numbers of "52 to 55", "0" is recorded as the value of the information since a point P32 which indicates the end position of the zone #3 in the L0 layer is not defined. In the field with byte numbers of "56 to 59", a sector number "X31" of a point P33 (matching the point P31) which indicates the border position in the zone #3, i.e. the sector number "X31" shown by the NWA, is recorded. Incidentally, the "X31" shows the second one of the at most three points at which the recording can be started. In the field with byte numbers of "60 to 63", a sector number "X24" of the point P24 which indicates the end position of the zone #3 in the L1 layer is recorded.

"0" is recorded in the field after this, with the values of various information in the zone specification information 12.

Back in FIG. 9 again, by repeating the above-mentioned step S105 to step S115, a series of process of another recording operation or the like by the recording unit of zone is repeated.

More specifically, as a result of another recording operation by the recording unit of zone, as shown in FIG. 12, the "zone #3" in the "partially reservation available state (refer to FIG. 6(d))" and the "zone #4" in the "incomplete state (refer to FIG. 6(b))" are further recorded in the data areas 102-0 and 102-1.

Moreover, FIG. 13 shows one specific example of the zone information 10 corresponding to the recording areas shown in FIG. 12. More specifically, as described above, the zone information 10 included in the RMD is provided with the following three information, as the pointer information 11, in order to indicate the at most three points at which the recording can be started, currently, on the optical disc 100. In other words, it is provided with information about: (i) "#4" which is the zone number 11a which indicates a zone in the "incomplete state"; (ii) "#1" which is the zone number 11b which indicates a zone in the "first reservation available state"; and (iii) "3" which is the zone number 11c which indicates a zone in the "second reservation available state".

Furthermore, on the optical disc 100, the zone information 10 included in the RMD is further provided with the zone specification information 12, in order to specify the "zone #3" in the partially reservation available state and the "zone #4" in the incomplete state.

With respect to the "zone #3" in the partially reservation available state, more specifically, in the field with byte numbers of "48 to 51", a sector number "X31" of a point P31 which indicates the start position of the zone #3 in the L0 layer is recorded. In the field with byte numbers of "52 to 55", a sector number "X32" of a point P32 which indicates the end position of the zone #3 in the L0 layer is recorded. In the field with byte numbers of "56 to 59", a sector number "X33" of a point P33 which indicates the border position in the zone #3, i.e. the sector number "X33" shown by the NWA, is recorded. Incidentally, the "X33" shows the second one of the at most three points at which the recording can be started (the above-mentioned "X11" shows the first one). In the field with byte numbers of "60 to 63", a sector number "X34" of a point P34 which indicates the end position of the zone #3 in the L1 layer is recorded.

With respect to the "zone #4" in the incomplete state, more specifically, in the field with byte numbers of "64 to 67", a sector number "X41" of a point P41 which indicates the start position of the zone #4 in the L0 layer is recorded. In the field with byte numbers of "68 to 71", "0" is recorded as the value of the information since a point P42 which indicates the end position of the zone #4 in the L0 layer is not defined. In the field with byte numbers of "72 to 75", a sector number "X43" of a point P43 which indicates the border position in the zone #4, i.e. the sector number "X43" shown by the NWA, is recorded. Incidentally, the "X43" shows the third one of the at most three points at which the recording can be started. In the field with byte numbers of "76 to 79", "0" is recorded as the value of the information, since a point P44 which indicates the end position of the zone #4 in the L1 layer is not defined.

Back in FIG. 9 again, after a series of process of the recording operation or the like by the recording unit of zone is completed, as a result of the judgment in the step S111, if the finalize process is performed (the step S111: Yes), a file system, such as a UDF bridge file system, is recorded, in the "zone #1" (step S112). More specifically, as shown in FIG. 14 and FIG. 15, the "zone #1" is specified by the point. P11 (sector number X11), the point P12 (sector number X12), the point P13 (sector number X13), and the point P14 (sector number X14). Incidentally, the point P13 matches the point P14.

Moreover, since a series of process of the recording operation or the like by the recording unit of zone is completed, the record information is recorded in the "zone #2" to the "zone #n". More specifically, as shown in FIG. 14 and FIG. 15, the "zone #2" is specified by the point P21 (sector number X21), the point P22 (sector number X22), the point P23 (sector number X23), and the point P24 (sector number X24). Incidentally, the point P23 matches the point P24. In the same manner, the "zone #n" is specified by the point Pn1 (sector number Xn1), the point Pn2 (sector number Xn2), the point Pn3 (sector number Xn3), and the point Pn4 (sector number Xn4).

In addition, as shown in FIG. 15, the zone information 10 included in the RMD is provided with the following three information, as the pointer information 11, in order to indicate the at most three points at which the recording can be started, currently, on the optical disc 100. In other words, it is provided with information about: (i) "#n" which indicates a zone in the "incomplete (or not-recognized) state" located on the most outer circumference; (ii) "0" which is the zone number 11b which indicates a zone in the "first reservation available state"; and (iii) "0" which is the zone number 11c which indicates a zone in the "second reservation available state".

Back in FIG. 9 again, following the step S112, the RMD including the newest zone information 10, explained in the above-mentioned FIG. 15, is recorded into the RMA 106-0 (106-1) (step S113).

Then, the buffer data constituting one portion of the record information is recorded for the purpose of the finalize process (step S114). More specifically, as shown in FIG. 16, it is recorded in the shifted middle area 104s-0 (104s-1), which constitutes one example of the "variable buffer area" of the present invention, the lead-in area 101-0, and the lead-out area 103-1. Incidentally, the area recorded for the finalize process is shown by horizontal stripes in FIG. 16 (and FIG. 21 described later).

(3) Study of Operation and Effect of Embodiment According to Information Recording Medium and Information Recording Apparatus of the Present Invention Next, with reference to FIG. 17 to FIG. 21, consideration will be given to the operation and effect of the embodiment of the information recording medium and the information recording apparatus of the present invention. FIG. 17 is an enlarged schematic diagram of the data area showing one specific example of a position to specify the zone in a comparison example, and an address which indicates the position. FIG. 18 is a table showing the data structure of zone information included in an RMD constituting one example of the "management information" of the comparison example. FIG. 19 is a schematic diagram showing the recording areas in which a zone #1, a zone #2, or the like are recorded as a result of one recording operation by an information recording/reproducing apparatus in the comparison example. FIG. 20 is a schematic diagram showing the recording areas after the recording of the record information is completed by the information recording/reproducing apparatus in the comparison example and a file system, such as a UDF bridge file system, is recorded, for example. FIG. 21 is a schematic diagram showing the recording areas after the finalize process by the information recording/reproducing apparatus in the comparison example.

The data areas 102-0 and 102-1 on the optical disc 100 in the comparison example are provided with a zone or zones defined for each layer, as shown in FIG. 17. In other words, the zone #n in the comparison example is specified by the following two points. Namely, it is specified by (i) the point Pn1 (sector number: Xn1) which indicates the start position of the zone #n in one recording layer of the L0 layer or the L1 layer, and (ii) the point Pn2 (sector number: Xn2) which indicates the end position of the zone #n.

Therefore, as shown in FIG. 18, the data structure of the RMD in the comparison example is substantially the same as in the embodiment; however, one zone #n is specified by a data amount of 8 bytes. More specifically, as shown in FIG. 19, the "zone #1" in the "wholly reservation available state (refer to FIG. 6(c))" and the "zone #2" in the "complete state (refer to FIG. 7(c))" are recorded in the data area 102-0. Moreover, the "zone #3" in the "not-recognized state (refer to FIG. 6(a))" is recorded on the outer circumferential side of the "zone #2". Then, as shown in FIG. 20, after a series of process of the recording operation or the like by the recording unit of zone in the comparison example is completed, a file system, such as a UDF bridge file system, is recorded, in the "zone #1". Moreover, the record information is recorded in the "zone #2" to the "zone #n".

However, on the information recording medium in the comparison example, as shown in FIG. 21, it is necessary to redundantly record the buffer data, which constitutes one portion of the record information, for the purpose of the finalize process. More specifically, the buffer data is recorded into the shifted middle area 104s-0 (104s-1), the lead-in area 101-0, and the lead-out area 103-1. In addition, in the comparison example, it is necessary to record the useless record information, such as dummy data, into the recording areas of the L1 layer facing to the zone #1 to the zone #n of the L0 layer.

As described above, on the information recording medium in the comparison example, there is a need to record the useless data, such as dummy data "Null", in addition to the effective record information, such as content information, into the unrecorded area of the L1 layer facing the recording area of the L0 layer, for example. This is because tracking servo in the layer focus jump (layer change) of the optical pickup is normally controlled upon the reproduction operation of a general DVD-ROM drive, to thereby normally reproduce user data. Therefore, it takes more time to perform the actual finalize process, by the recording time length of the useless data, in addition to the recording time length of the effective record information, such as the content information.

Specifically, it is because in the case where it is unrecorded on the inner circumferential side of the L1 layer, for example, without the dummy data recorded, if the optical pickup enters therein, the tracking servo is off because of no RF reproduction signal, which causes runaway. Specifically, for example, in the case where the optical pickup of a DVD-ROM drive firstly performs focusing on the L1 layer, i.e., layer focus jump (layer change), in order to access a targeted sector number (e.g. "Y1") in the L1 layer from a predetermined sector number (e.g. "X0") in the L0 layer on the two-layer type optical disc, if a sector number (e.g. "Z1") in the L1 layer is unrecorded which is the destination of the layer focus jump, the optical pickup cannot be controlled under the tracking servo in a phase difference method, for example, which causes the runaway. More specifically, the optical pickup of a DVD-ROM reproduce-only drive in which the phase difference method is adopted can be hardly controlled or cannot be controlled at all under the tracking servo, with respect to the unrecorded area on a DVD-R in which a push-pull method is adopted. Additionally, this is one example of the case where it is impossible to reproduce the information on the DVD-R by using the DVD-ROM drive.

As opposed to this, according to the embodiment of the information recording medium and the information recording apparatus of the present invention, discussed with reference to FIG. 1 to FIG. 16, the record information is sequentially recorded from the inner circumferential side in each of the L0 layer and the L1 layer, by the recording unit of zone bridged over the two layers. Thus, it is possible to substantially equalize the already-recorded recording area of the L0 layer and the already-recorded recording area of the L1 layer.

Therefore, the time length to perform the finalize process is substantially equal to the time length of recording the effective record information, such as the content information. Thus, it is possible to greatly reduce the recording time length, as compared to the comparison example, to thereby contribute to the improvement in a user's comfortableness or the like, which is dramatically advantageous. More specifically, if the record information has a smaller data capacity than that of the optical disc, as shown in the above-mentioned FIG. 16, being in the unrecorded state (i.e. mirror state) is enough on the outer circumferential side of the shifted middle area $104s\text{-}0$ ($104s\text{-}1$), for example.

In addition, the zone of the present invention can be specified by the RMD having substantially the same data structure as that of the conventional RMD, so that it is extremely preferable.

(4) Other Embodiments of Information Recording Medium of Present Invention

Next, with reference to FIG. 22, a second embodiment to a sixth embodiment of the information recording medium of the present invention will be discussed. FIG. 22(a) to FIG. 22(e) are enlarged schematic diagrams of the data areas showing specific examples of a position to specify the zone in other embodiments of the information recording medium of the present invention. Incidentally, in the other embodiments, it is obvious that the address, such as the sector number, is automatically and uniquely (i.e. having one to one relationship) specified if a predetermined point is specified, as in the first embodiment.

As shown in FIG. 22(a), the zone #n in the second embodiment can be specified by the following four points. The four points may be (i) the point Pn1 which indicates the start position of the zone #n in the L0 layer, (ii) the point Pn2 which indicates the end position of the zone #n in the L0 layer, (iii) the point Pn3 which indicates a border or boundary position between the recorded area and the unrecorded area in the present invention, and (iv) a point Pn5 which indicates the start position of the zone #n in the L1 layer. It can be said that the second embodiment uses a fact that the point Pn4 in the embodiment can be obtained by the point Pn1 located in the facing position.

As shown in FIG. 22(b), the zone #n in the third embodiment can be specified by the following two points. The two points may be (i) the point Pn1 which indicates the start position of the zone #n in the L0 layer, and (iii) the point Pn3 which indicates a border or boundary position between the recorded area and the unrecorded area in the present invention. It can be said that the second embodiment uses a fact that the point Pn2 in the embodiment can be obtained by the point Pn1 located in a next zone #n+1. In addition, in the third embodiment, as in the second embodiment, it can be also said that the point Pn4 in the embodiment can be obtained by the point Pn1 located in the facing position.

As shown in FIG. 22(c), the zone #n in the fourth embodiment can be specified by the following five points. The five points may be (i) the point Pn1 which indicates the start position of the zone #n in the L0 layer, (ii) the point Pn2 which indicates the end position of the zone #n in the L0 layer, (iii) the point Pn3 which indicates a border or boundary position between the recorded area and the unrecorded area in the present invention, (iv) the point Pn5 which indicates the start position of the zone #n in the L1 layer, and (v) the point Pn4 which indicates the end position of the zone #n in the L1 layer. It can be said that the fourth embodiment is obtained by combining the first and second embodiments.

As shown in FIG. 22(d) and FIG. 22(e), in the fifth and sixth embodiments, the zone #n may be constructed by reversing the position relationship between the L0 layer and the L1 layer in the first and second embodiments. Therefore, the present invention can be applied to another recording manner, such as a parallel manner, in addition to the opposite manner.

In the embodiment, the write-once or rewritable type optical disc, such as a two-layer type DVD-R or DVD+R, and a DVD-RW or DVD+RW, is discussed as one specific example of the information recording medium. The present invention, however, can be applied to a multiple layer type optical disc, such as a three-layer type. Moreover, it can be applied to other various information recording media supporting high-density recording or high transmission rates, such as a disc which uses blue laser for the recording/reproduction.

Furthermore, in the embodiments, the information recording/reproducing apparatus for additional recording or writing once, such as a DVD-R recorder and a DVD+R recorder, is explained as one example of the information recording apparatus. The present invention, however, can be applied to an information recording/reproducing apparatus for rewriting, such as a multiple layer type optical disc, such as a DVD-R recorder and a DVD+R recorder. Moreover, it can be applied to an information recording/reproducing apparatus for the other various information recording media supporting high-density recording or high transmission rates, such as a disc which uses blue laser for the recording/reproduction.

The present invention is not limited to the above-described embodiments, and various changes may be made, if desired, without departing from the essence or spirit of the invention which can be read from the claims and the entire specification. An information recording medium, an information recording apparatus and method, and a computer program for recording control, all of which involve such changes, are also intended to be within the technical scope of the present invention.

INDUSTRIAL APPLICABILITY

The information recording medium, the information recording apparatus and method, and the computer program according to the present invention can be applied to a high-density optical disc, such as a DVD, and further to a recording apparatus, such as a DVD recorder. Moreover, they can be applied to a recording apparatus or the like which is mounted on various computer equipment for consumer use or for commercial use, or which can be connected to various computer equipment.

The invention claimed is:

1. An information recording medium comprising:
    a first recording layer in which a first recording track to record therein a record information is formed;
    a second recording layer in which a second recording track to record therein the record information is formed; and
    a management information recording area to record therein management information for recording the record information, by a recording unit of a zone including one recording area of said first recording layer and another recording area of said second recording layer located in a position facing the one recording area,
    a first start address and a first end address, which respectively indicate a start position and an end position of the first recording track to specify the zone, and a border address, which indicates a border position between a recorded area and an unrecorded area of the specified zone, being recorded as the management information into said management information recording area.

2. The information recording medium according to claim 1, wherein
    the zone is constructed to equalize a data amount of the one recording area and a data amount of the another recording area as much as possible, as compare to in random distribution, and
    a first start address, which indicates a start position of the first recording track to specify the zone, and a border address, which indicates a border position between a recorded area and an unrecorded area of the specified zone, are recorded as the management information into said management information recording area.

3. The information recording medium according to claim 1, wherein a first start address and a first end address, which respectively indicate a start position and an end position of the first recording track to specify the zone, a second start address, which indicates a start position of the second recording track, and a border address, which indicates a border position between a recorded area and an unrecorded area of the specified zone, are recorded as the management information into said management information recording area.

4. The information recording medium according to claim 1, wherein a first start address and a first end address, which respectively indicate a start position and an end position of the first recording track to specify the zone, a second end address, which indicates an end position of the second recording track, and a border address, which indicates a border position between a recorded area and an unrecorded area of the specified zone, are recorded as the management information into said management information recording area.

5. The information recording medium according to claim 1, wherein a first start address and a first end address, which respectively indicate a start position and an end position of the first recording track to specify the zone, a second start address and a second end address, which respectively indicate a start position and an end position of the second recording track, and a border address, which indicates a border position between a recorded area and an unrecorded area of the specified zone, are recorded as the management information into said management information recording area.

6. The information recording medium according to claim 1, wherein a recording direction of the first recording track and a recording track of the second recording track are opposite.

7. The information recording medium according to claim 1, wherein a recording direction of the first recording track and a recording track of the second recording track are equal.

8. An information recording apparatus for recording a record information onto an information recording medium, said information recording medium comprising:
    a first recording layer in which a first recording track to record therein the record information is formed;
    a second recording layer in which a second recording track to record therein the record information is formed; and
    a management information recording area to record therein management information for recording the record information, by a recording unit of a zone including one recording area of said first recording layer and another recording area of said second recording layer located in a position facing the one recording area,
    a first start address and a first end address, which respectively indicate a start position and an end position of the first recording track to specify the zone, and a border address, which indicates a border position between a recorded area and an unrecorded area of the specified zone, being recorded as the management information into said management information recording area,
    said information recording apparatus comprising:
    a recording device capable of recording the record information into at least one of said first recording layer and said second recording layer;
    a reading device for reading the management information from said management information recording area; and
    a controlling device for controlling said recording device to record the record information on the basis of the read management information.

9. The information recording apparatus according to claim 8, further comprising:
    a reserving device for reserving one zone targeted for recording of the record information,
    said controlling device controlling said recording device to record the record information into the reserved one zone.

10. The information recording apparatus according to claim 8, further comprising:
    an updating device for updating the management information at a same time or before or after recording of the record information.

11. The information recording apparatus according to claim 8, wherein
    said information recording medium further comprises, in said first recording layer and said second recording layer:
    (i) a data area including a plurality of zones; and at least one area of (ii) a fixed buffer area whose radial position is fixed; (iii) a variable buffer area which is located on an inner circumferential side of the fixed buffer area, which can be disposed adjacently to the data area, and which is variable in length; (iv) a lead-in area; and (v) a lead-out area, the both buffer areas, the lead-in area, and the lead-out area being formed by recording buffer data, which is at least one portion of the record information, in order to prevent a recording or reproduction position with respect to said first recording layer and said second recording layer from deviating to an unrecorded area, and said controlling device controls said recording device to record the buffer data to form the at least one area, in response to a finalize command with respect to said information recording medium.

12. The information recording apparatus according to claim 11, wherein said information recording medium further comprises, in said first recording layer and said second recording layer:

the data area including a plurality of borders in place of or in addition to the zones;

(vi) a border-in in place of or in addition to the lead-in area; and (vii) a border-out in place of or in addition to the lead-out area, and said controlling device controls said recording device to record the buffer data to form the at least one of the border-in and the border-out, in response to a border close command with respect to said information recording medium.

13. An information recording method in an information recording apparatus comprising: a recording device capable of recording a record information into at least one of a first recording layer and a second recording layer with respect to an information recording medium, said information recording medium comprising:

the first recording layer in which a first recording track to record therein the record information is formed;

the second recording layer in which a second recording track to record therein the record information is formed; and a management information recording area to record therein management information for recording the record information, by a recording unit of a zone including one recording area of said first recording layer and another recording area of said second recording layer located in a position facing the one recording area, a first start address and a first end address, which respectively indicate a start position and an end position of the first recording track to specify the zone, and a border address, which indicates a border position between a recorded area and an unrecorded area of the specified zone, being recorded as the management information into said management information recording area, said information recording method comprising:

a reading process of reading the management information from said management information recording area; and a controlling process of controlling said recording device to record the record information on the basis of the read management information.

14. An information reproducing apparatus for reproducing a record information recorded on an information recording medium, said information recording medium comprising:

a first recording layer in which a first recording track to record therein the record information is formed;

a second recording layer in which a second recording track to record therein the record information is formed; and a management information recording area to record therein management information for recording the record information by a recording unit of a zone including one recording area of said first recording layer and another recording area of said second recording layer located in a position facing the one recording area, a first start address and a first end address, which respectively indicate a start position and an end position of the first recording track to specify the zone, and a border address, which indicates a border position between a recorded area and an unrecorded area of the specified zone being recorded as the management information into said management information recording area, said information reproducing apparatus comprising:

a reproducing device capable of reproducing the record information in at least one of said first recording layer and said second recording layer;

a reading device for reading the management information from said management information recording area; and a controlling device for controlling said reproducing device to reproduce the record information on the basis of the read management information.

15. An information reproducing method in an information reproducing apparatus comprising:

a reproducing device capable of reproducing a record information in at least one of a first recording layer and a second recording layer with respect to an information recording medium, said information recording medium comprising:

the first recording layer in which a first recording track to record therein the record information is formed;

the second recording layer in which a second recording track to record therein the record information is formed; and a management information recording area to record therein management information for recording the record information by a recording unit of a zone including one recording area of said first recording layer and another recording area of said second recording layer located in a position facing the one recording area, a first start address and a first end address which respectively indicate a start position and an end position of the first recording track to specify the zone, and a border address, which indicates a border position between a recorded area and an unrecorded area of the specified zone, being recorded as the management information into said management information recording area, said information reproducing method comprising:

a reading process of reading the management information from said management information recording area; and a controlling process of controlling said reproducing device to reproduce the record information on the basis of the read management information.

* * * * *